United States Patent
Iijima et al.

(10) Patent No.: US 12,142,770 B2
(45) Date of Patent: Nov. 12, 2024

(54) CARBON MATERIAL FOR USE AS CATALYST CARRIER OF POLYMER ELECTROLYTE FUEL CELL AND METHOD OF PRODUCING THE SAME

(71) Applicant: NIPPON STEEL CHEMICAL & MATERIAL CO., LTD., Tokyo (JP)

(72) Inventors: Takashi Iijima, Tokyo (JP); Kenichiro Tadokoro, Tokyo (JP); Masataka Hiyoshi, Tokyo (JP); Shinya Furukawa, Tokyo (JP); Tomoko Komura, Tokyo (JP); Kazuyoshi Masaki, Tokyo (JP); Hiroyuki Hayashida, Tokyo (JP); Wakana Tada, Tokyo (JP)

(73) Assignee: NIPPON STEEL CHEMICAL & MATERIAL CO., LTD., Tokyo (JP)

( * ) Notice: Subject to any disclaimer, the term of this patent is extended or adjusted under 35 U.S.C. 154(b) by 521 days.

(21) Appl. No.: 16/499,640

(22) PCT Filed: Apr. 2, 2018

(86) PCT No.: PCT/JP2018/014152
§ 371 (c)(1),
(2) Date: Sep. 30, 2019

(87) PCT Pub. No.: WO2018/182045
PCT Pub. Date: Oct. 4, 2018

(65) Prior Publication Data
US 2020/0119367 A1   Apr. 16, 2020

(30) Foreign Application Priority Data
Mar. 31, 2017 (JP) .................. 2017-071626

(51) Int. Cl.
*H01M 4/90* (2006.01)
*B01J 21/18* (2006.01)
(Continued)

(52) U.S. Cl.
CPC .......... *H01M 4/9083* (2013.01); *B01J 21/18* (2013.01); *B01J 35/60* (2024.01); *B01J 37/04* (2013.01);
(Continued)

(58) Field of Classification Search
None
See application file for complete search history.

(56) References Cited

U.S. PATENT DOCUMENTS

| 2011/0058308 A1 | 3/2011 | Nishi et al. |
| 2015/0352522 A1 | 12/2015 | Mizuuchi et al. |
| 2017/0194652 A1 | 7/2017 | Iijima et al. |

FOREIGN PATENT DOCUMENTS

| CN | 106030877 A | 10/2016 |
| JP | 2014-201463 A | 10/2014 |

(Continued)

OTHER PUBLICATIONS

Marie et al., Synthesis of highly porous catalytic layers for polymer electrolyte fuel cell based on carbon aerogels, ECS Trans., 2006, 1, 509-519 (Year: 2006).*

(Continued)

*Primary Examiner* — Melissa S Swain
*Assistant Examiner* — Keling Zhang
(74) *Attorney, Agent, or Firm* — Birch, Stewart, Kolasch & Birch, LLP

(57) ABSTRACT

A carbon material for use as a catalyst carrier for a polymer electrolyte fuel cell which is a porous carbon material and satisfies at the same time (1) the content of a crystallized material is 1.6 or less, (2) the BET specific surface area obtained by a BET analysis of a nitrogen gas adsorption isotherm is from 400 to 1500 $m^2/g$, (3) the cumulative pore volume $V_{2-10}$ with respect to a pore diameter of from 2 to 10 nm obtained by an analysis of a nitrogen gas adsorption (Continued)

isotherm using the Dollimore-Heal method is from 0.4 to 1.5 mL/g, and (4) the nitrogen gas adsorption amount $V_{macro}$ between a relative pressure of 0.95 and 0.99 in a nitrogen gas adsorption isotherm is from 300 to 1200 cc (STP)/g, and the method of producing the same.

4 Claims, 4 Drawing Sheets

(51) Int. Cl.
    *B01J 35/60*     (2024.01)
    *B01J 37/04*     (2006.01)
    *B01J 37/06*     (2006.01)
    *B01J 37/08*     (2006.01)
    *H01M 4/88*     (2006.01)
    *H01M 8/10*     (2016.01)

(52) U.S. Cl.
    CPC ............. *B01J 37/06* (2013.01); *B01J 37/084* (2013.01); *H01M 4/8807* (2013.01); *H01M 4/881* (2013.01); *H01M 2008/1095* (2013.01)

(56) References Cited

FOREIGN PATENT DOCUMENTS

| | | |
|---|---|---|
| WO | WO 2009/075264 A1 | 6/2009 |
| WO | WO 2014/129597 A1 | 8/2014 |
| WO | WO 2015/088025 A1 | 6/2015 |
| WO | WO 2015/141810 A1 | 9/2015 |
| WO | WO 2016/133132 A1 | 8/2016 |

OTHER PUBLICATIONS

Marie et al., Highly porous PEM fuel cell cathodes based on low density carbon aerogels as Pt-support: Experimental study of the mass-transport losses, Journal of Power Sources, 2009, 190, 423-434 (Year: 2009).*

International Search Report (PCT/ISA/210) issued in PCT/JP2018/014152, mailed on May 15, 2018.

Written Opinion (PCT/ISA/237) issued in PCT/JP2018/014152, mailed on May 15, 2018.

* cited by examiner

[Fig. 1]
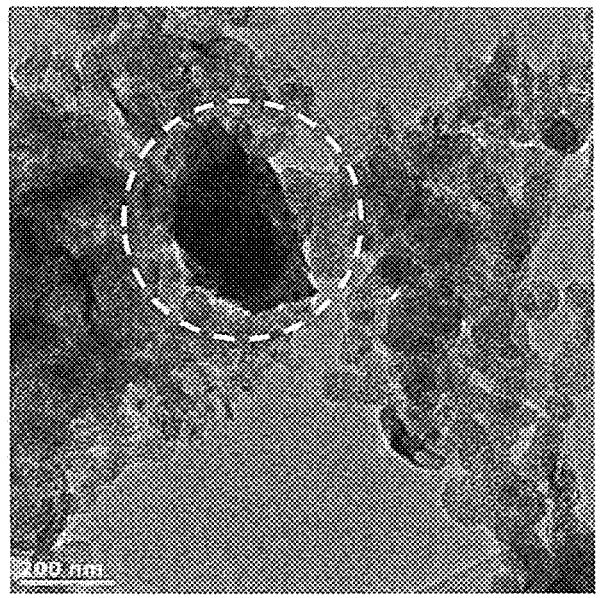
[Fig. 2]
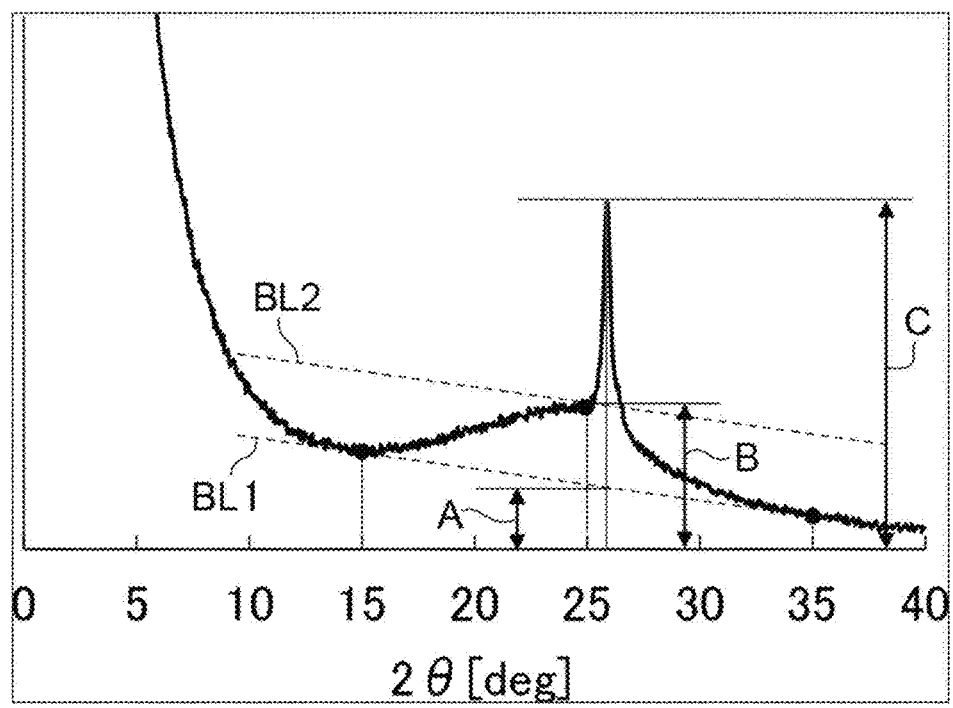

[Fig. 3]
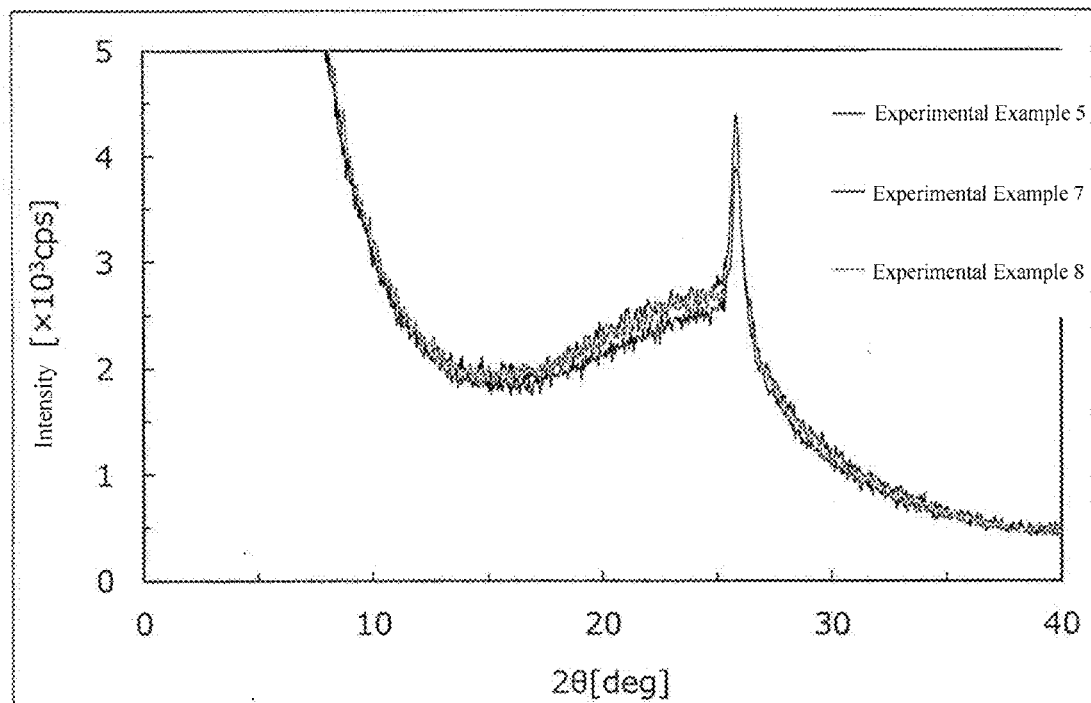
[Fig. 4]
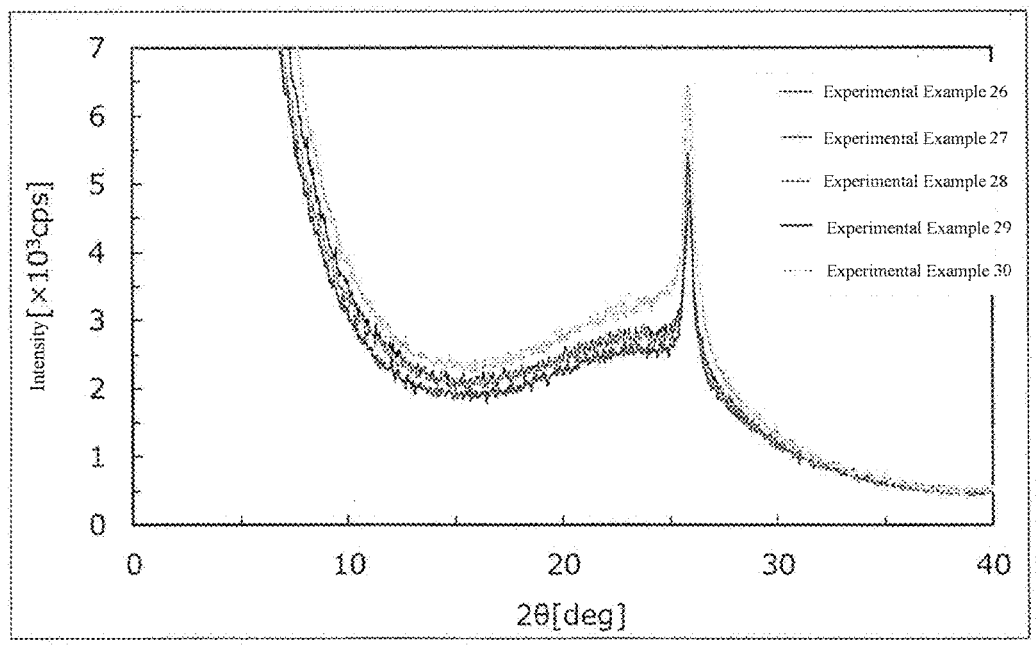

[Fig. 5A]
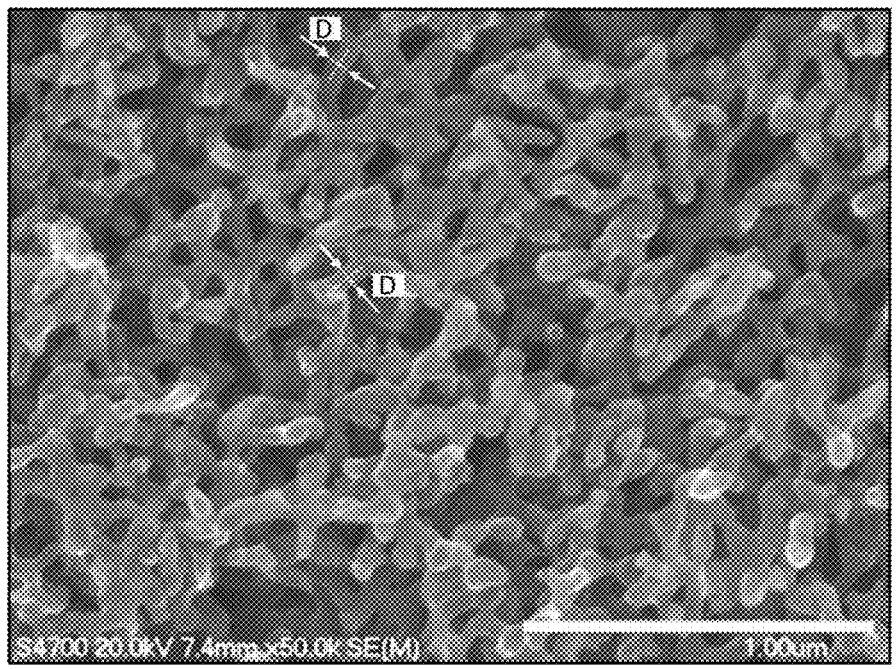
[Fig. 5B]
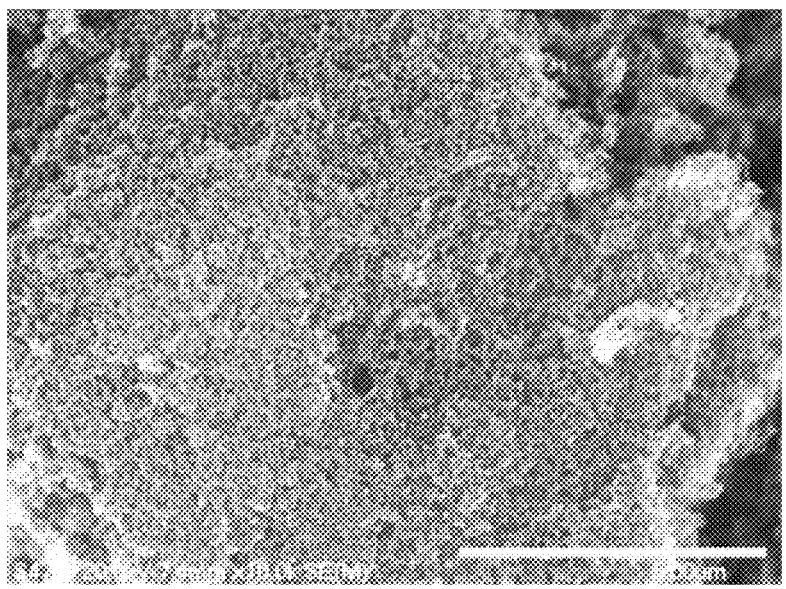

[Fig. 6]
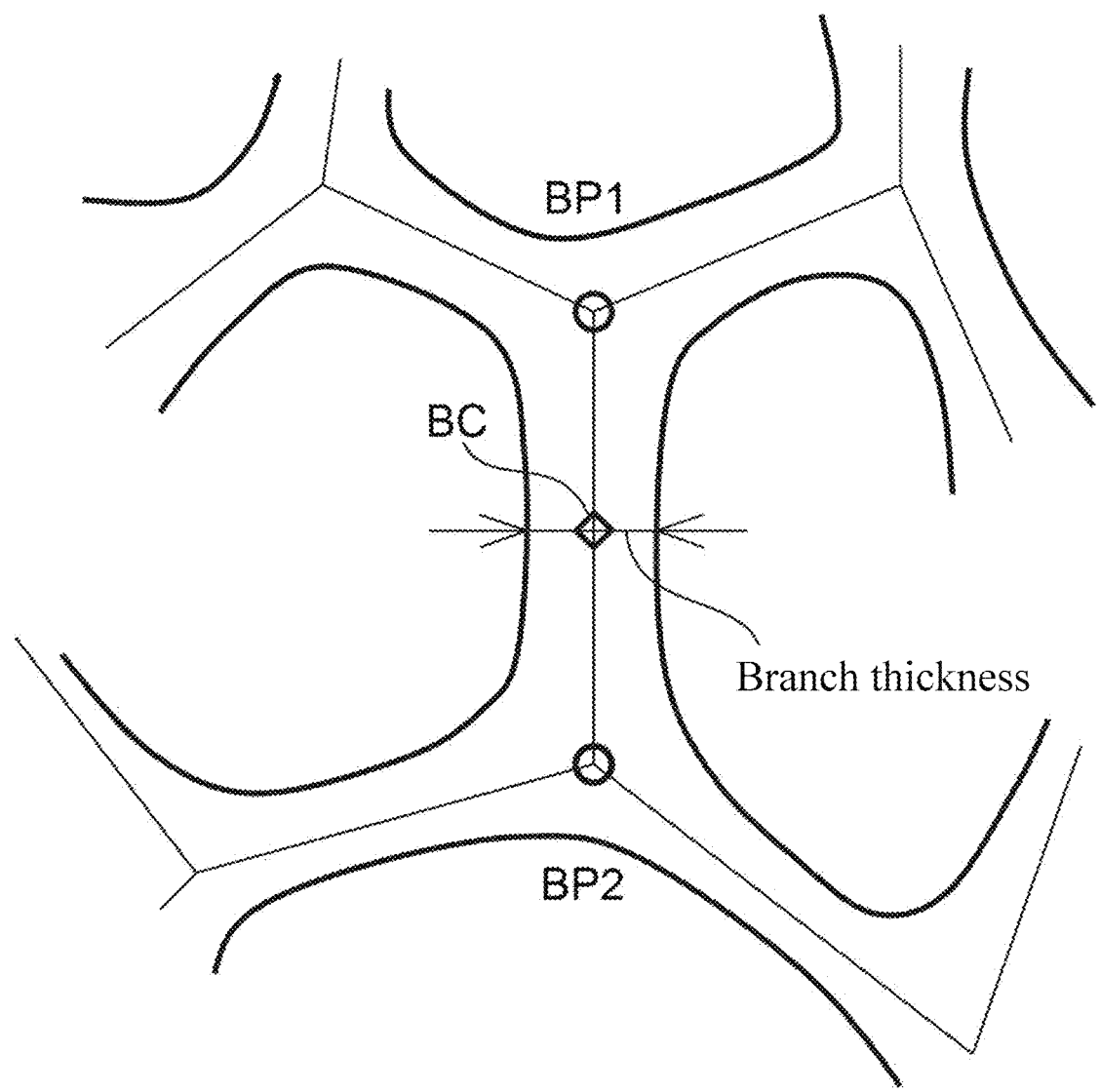

CARBON MATERIAL FOR USE AS CATALYST CARRIER OF POLYMER ELECTROLYTE FUEL CELL AND METHOD OF PRODUCING THE SAME

TECHNICAL FIELD

The present disclosure relates to a carbon material for use as a catalyst carrier of a polymer electrolyte fuel cell and a method of producing the same.

BACKGROUND ART

In recent years, attention has been paid to a polymer electrolyte fuel cell which can operate at a low temperature of 100° C. or less, and development and commercialization thereof have been progressed as a driving power source for a vehicle, and a stationary power generation device. The basic structure (unit cell) of a general polymer electrolyte fuel cell is constituted with a membrane electrode assembly (MEA) constituted with a proton conductive electrolyte membrane, and on each side thereof a catalyst layer to function as an anode or a cathode sandwiching the electrolyte membrane; and gas diffusion layers disposed on the outside of the respective catalyst layers sandwiching the membrane electrode assembly; as well as separators disposed on the outer side of the gas diffusion layers. In general, a polymer electrolyte fuel cell is configured by stacking as many unit cells as necessary to achieve the required output.

In such a unit cell of a polymer electrolyte fuel cell, on the cathode side an oxidative gas, such as oxygen, or air, and on the anode side a fuel such as hydrogen are supplied through gas channels in the separators disposed on the anode side and the cathode side respectively. When these supplied oxidative gas and fuel (these are occasionally referred to as "reactive gases") are respectively supplied to the catalyst layers through the gas diffusion layers, work may be taken out utilizing an energy difference (electric potential difference) between the chemical reaction occurring in the anode catalyst layer and the chemical reaction occurring in the cathode catalyst layer. For example, when a hydrogen gas is used as the fuel, and an oxygen gas is used as the oxidative gas, the energy difference (electric potential difference) between the chemical reaction occurring in the anode catalyst layer [oxidation reaction: $H_2 \rightarrow 2H^+ + 2e^-$ ($E_0 = 0$ V)] and the chemical reaction occurring in the cathode catalyst layer [reduction reaction: $O_2 + 4H^+ + 4e^- \rightarrow 2H_2O$ ($E_0 = 1.23$ V)] is taken out as work.

In this regard, for a catalyst that causes the chemical reaction by forming the catalyst layer as described above, a porous carbon material is usually used as a catalyst carrier from the viewpoints of electron conductivity, chemical stability, and electrochemical stability. Meanwhile, as a catalyst metal, Pt or a Pt alloy, which can be used in a strongly acidic environment, and exhibits high reactivity with respect to both the oxidation reaction and the reduction reaction, is mainly used. Further with respect to the catalyst metal, since the oxidation reaction and the reduction reaction occur generally on the catalyst metal, in order to increase the utilization rate of the catalyst metal, it is necessary to increase the specific surface area with respect to the mass. For this reason, particles having a size of about several nanometers are usually used as the catalyst metal.

With respect to a catalyst carrier carrying such catalyst metal particles, in order to increase the carrying capacity as a carrier, namely to increase the number of sites for adsorbing and carrying the catalyst metal particles with a size of about several nanometers, the carrier is required to be a porous carbon material having a large specific surface area. Also it is required to be a porous carbon material having a large volume of mesopores with a pore diameter of from 2 to 50 nm, namely having a large mesopore volume, in order to support the catalyst metal particles in a highly dispersed state to the extent possible. At the same time, when the catalyst layer to serve as the anode or the cathode is formed, it is necessary to form fine pores suitable for diffusion of a reactive gas and discharge of produced water in this catalyst layer, so as to diffuse the reactive gas supplied into the catalyst layer without resistance, and to discharge the water generated in the catalyst layer (produced water) without delay.

Therefore, conventionally, as a porous carbon material having a relatively large specific surface area and mesopore volume, and at the same time having a dendritic structure with sterically well-developed branches, for example, Vulcan XC-72 produced by Cabot Corporation, EC 600 JD produced by Lion Corporation, and EC 300 produced by Lion Corporation have been used. In addition, development of a porous carbon material having a more suitable specific surface area and mesopore volume, and also having a more suitable dendritic structure as a carbon material for use as a catalyst carrier has been attempted. A dendritic carbon nanostructure that is produced from a metal acetylide, such as silver acetylide, having a three-dimensionally branched structure as an intermediate, and maintains the three-dimensional dendritic structure, has been attracting particular attention in recent years. For this dendritic carbon nanostructure, several proposals have been made so far.

For example, Patent Literature 1 proposes a carbon material for use as a catalyst carrier usable for preparing a catalyst for a polymer electrolyte fuel cell exhibiting a low rate of decrease in current amount over a long period, and excellent durability.

Specifically, Patent Literature 1 proposes a porous carbon material prepared by a producing method including a step of preparing a solution containing a metal or a metal salt; a step of blowing an acetylene gas into the solution to form a dendritic carbon nanostructure composed of a metal acetylide; a step of heating the carbon nanostructure at from 60 to 80° C. to form a metal-encapsulated dendritic carbon nanostructure in which a metal is encapsulated in the dendritic carbon nanostructure; a step of heating the metal-encapsulated dendritic carbon nanostructure to between 160 and 200° C. to eject the metal such that a dendritic mesoporous carbon structure is formed; and a step of heating the mesoporous carbon structure to between 1600 and 2200° C. in a reduced pressure atmosphere or in an inert gas atmosphere. The porous carbon material has a pore diameter of from 1 to 20 nm, and a cumulative pore volume of from 0.2 to 1.5 cc/g, which are obtained from a nitrogen adsorption isotherm analyzed by the Dollimore-Heal method, as well as a BET specific surface area of from 200 to 1300 $m^2/g$.

Patent Literature 2 proposes a carrier carbon material capable of preparing a catalyst for a polymer electrolyte fuel cell which is able to exhibit high battery performance in a high humidification condition.

Specifically, Patent Literature 2 proposes a porous carbon material prepared by a producing method including an acetylide producing step of forming a metal acetylide by blowing an acetylene gas into an aqueous ammonia solution containing a metal or a metal salt; a first heat treatment step of heating the metal acetylide at from 60 to 80° C. to form a metal particle-encapsulated intermediate; a second heat treatment step of heating the metal particle-encapsulated intermediate at from 120 to 200° C. to make the metal particle-encapsulated intermediate eject the metal particles to yield a carbon material intermediate; a washing treatment step of cleaning the carbon material intermediate by bringing the carbon material intermediate into contact with hot concentrated sulfuric acid; and further a third heat treatment step of heat-treating the cleaned carbon material intermediate at from 1000 to 2100° C. to yield a carrier carbon material. The porous carbon material has a predetermined hydrogen content, a BET specific surface area of from 600 to 1500 m$^2$/g, and an intensity ratio ($I_D/I_G$) of the peak intensity of D-band ($I_D$) in a range of from 1200 to 1400 cm$^{-1}$ to the peak intensity of G-band ($I_G$) in a range of from 1500 to 1700 cm$^{-1}$ obtained in a Raman spectrum of from 1.0 to 2.0.

Patent Literature 3 proposes a carbon material for use as a catalyst carrier usable for preparing a catalyst for a polymer electrolyte fuel cell capable of exhibiting excellent durability against potential fluctuations, while maintaining high power generation performance.

Specifically, Patent Literature 3 proposes a porous carbon material prepared by a producing method including an acetylide producing step of forming a metal acetylide by blowing an acetylene gas into an aqueous ammonia solution containing a metal or a metal salt; a first heat treatment step of heating the metal acetylide at from 40 to 80° C. to form a metal particle-encapsulated intermediate; a second heat treatment step of heating a compact formed by compressing the metal particle-encapsulated intermediate at a rate of temperature increase of 100° C./min, or higher to 400° C. or higher to make the metal particle-encapsulated intermediate eject the metal particles to yield a carbon material intermediate; a washing treatment step of cleaning the carbon material intermediate by bringing the carbon material intermediate into contact with hot concentrated nitric acid, or hot concentrated sulfuric acid; and further a third heat treatment step of heat-treating the cleaned carbon material intermediate at from 1400 to 2100° C. in a vacuum or in an inert gas atmosphere to yield a carrier carbon material. The porous carbon material has a specific surface area SA of mesopores having a pore diameter of from 2 to 50 nm of from 600 and 1600 m$^2$/g, which is obtained by analyzing a nitrogen adsorption isotherm according to the Dollimore-Heal method, and an intensity ratio ($I_{G'}/I_G$) of the peak intensity of G'-band ($I_{G'}$) in a range of from 2650 to 2700 cm$^{-1}$ to the peak intensity of G-band ($I_G$) in a range of from 1550 to 1650 cm$^{-1}$ obtained in a Raman spectrum of from 0.8 to 2.2. The specific pore surface area $S_{2-10}$ of such portion of mesopores as having a pore diameter not less than 2 nm and less than 10 nm is between 400 and 1100 m$^2$/g, and the specific pore volume $V_{2-10}$ is between 0.4 and 1.6 cc/g; the specific pore surface area $S_{10-50}$ of such portion of mesopores as having a pore diameter not less than 10 nm and not more than 50 nm is between 20 and 150 m$^2$/g, and the specific pore volume $V_{2-10}$ is between 0.4 and 1.6 cc/g; and the specific pore surface area $S_2$ of pores having a pore diameter less than 2 nm, which is determined by analyzing the nitrogen adsorption isotherm of the adsorption process by the Horvath-Kawazoe method, is between 250 and 550 m$^2$/g.

Patent Literature 4 proposes a carbon material for use as a catalyst carrier usable for preparing a catalyst for a polymer electrolyte fuel cell which is superior in durability against repetitive load fluctuations such as start and stop, and superior in power generation performance under a low humidification operating conditions.

Specifically, Patent Literature 4 discloses a carbon material for use as a catalyst carrier, which is yielded using as a raw material a porous carbon material having a dendritic carbon nanostructure (ESCARBON®-MCND produced by Nippon Steel Sumikin Kagaku Co., Ltd.) prepared through a self-decomposing and explosive reaction using a metal acetylide as an intermediate, performing a graphitization treatment, and then additionally performing an oxidation treatment using hydrogen peroxide, and nitric acid with an in-liquid plasma device, etc. The carbon material for use as a catalyst carrier has an oxygen content $O_{ICP}$ of from 0.1 to 3.0% by mass, a residual oxygen content $O_{1200°\,C.}$ remaining after a heat treatment at 1200° C. in an inert gas atmosphere (or in a vacuum) of from 0.1 to 1.5% by mass, a BET specific surface area of from 300 to 1500 m$^2$/g, a half value width ΔG of the G band detected in a range of from 1550 to 1650 cm$^{-1}$ of a Raman spectrum of from 30 to 70 cm$^{-1}$, and a residual hydrogen content $H_{12000°\,C.}$ remaining after a heat treatment at 1200° C. in an inert gas atmosphere (or in a vacuum) of from 0.005 to 0.080% by mass.

Patent Literature 1: WO 2014/129597 A1
Patent Literature 2: WO 2015/088025 A1
Patent Literature 3: WO 2015/141810 A1
Patent Literature 4: WO 2016/133132 A1

SUMMARY OF INVENTION

Technical Problem

Any of the carbon materials for use as a catalyst carrier described in the Patent Literature 1 to 4 has a relatively large specific surface area and a mesopore volume, and is also superior in durability, and therefore it is superior in high current characteristics which are important for bringing out a large output especially when used as a fuel cell for an automobile.

With respect to a carbon material for use as a catalyst carrier produced by such a procedure, it is required that its particle diameter is from 20 nm to about 1 μm at the maximum in using actually the same for a catalyst layer. Within this range, it is believed that the mechanical strength can be maintained at a high level and the thickness of the catalyst layer can be controlled within an appropriate range, even when a carbon material for use as a catalyst carrier has a relatively large specific surface area or mesopore volume. In order to yield a carbon material for use as a catalyst carrier having a particle diameter of about 1 μm at the maximum, usually crushing, pulverization, and classification treatments (hereinafter collectively referred to as a "classification treatment") are performed in advance with a device such as a jet mill before the next step of producing a catalyst layer, so as to eliminate almost all of relatively large particles exceeding 1 μm.

However, there has been no description concerning a classification treatment of the conventional carbon materials for use as a catalyst carrier as described in Patent Literature 1 to 4. However, according to the investigation by the present inventors, when a classification treatment is conducted as described above on a carbon material for use as a catalyst carrier obtained by the conventional technique, it has been surprisingly found that the yield at the classification treatment is as low as from 80 to 90%. In other words, it has been found that a lot of comparatively coarse particles exceeding 1 μm which are excluded by the classification treatment are contained, and there remains a wide gap hardly to be filled until the ideal 100% yield is reached. As described above, a classification treatment with such a yield is carried out before actual use of a carbon material for use as a catalyst carrier for producing a catalyst layer, etc. As a result, the low yield has a direct influence on the production cost, and therefore it has been considered by the present inventors as an important problem to be solved.

The inventors studied the problem of such yield reduction in a classification treatment of a carbon material for use as a catalyst carrier in more detail. As a result, it has been surprisingly found with respect to the conventional carbon material for use as a catalyst carrier that massive carbon, which is coarse, and also highly crystalline and nonporous (hereinafter referred to as "crystallized material", see FIG. 1) formed by binding firmly part of carbon powders together, and is hardly crushed, or pulverized again, is contained in skeleton forming carbon forming a carbon material for use as a catalyst carrier, although in a small amount. It has been further elucidated that a large portion of the crystallized material is rejected by the classification treatment, which constitutes one of the causes of the reduction of the yield at a classification treatment.

Furthermore, the present inventors investigated diligently for elucidating how such a crystallized material is formed and included, to find a quantitative assessment method of the degree of formation and inclusion, and to find a method to reduce it to the extent possible. As a result the following findings have been obtained.

That is, in order to produce such a carbon material for use as a catalyst carrier, as described above, an acetylene gas is first blown into an aqueous ammonia solution containing a metal or a metal salt, specifically silver nitrate, to form a silver acetylide. In forming silver acetylide, in view of complete consumption of unreacted silver ions, which otherwise cause a decrease in yield and increase in cost, paying attention to the molar ratio of silver nitrate to acetylene reacting in the reaction system, an acetylene gas is blown into the reaction system excessively beyond the molar equivalent (acetylene/silver nitrate=0.5). When an acetylene gas is blown in excessively beyond the equivalent point of silver nitrate and acetylene, an excessive amount of the acetylide gas is adsorbed on the formed silver acetylide. If the silver acetylide having adsorbed the acetylene gas excessively is subjected to the subsequent self-decomposing and explosive reaction, a certain amount of "carbon with low aromaticity" (hereinafter referred to as "soot") is formed and included inevitably in carbon with high aromaticity to constitute eventually the skeleton of the carbon material for use as a catalyst carrier. So, it is inferred that the "carbon with low aromaticity (soot)" conjectured as above is bound each other, or to skeleton-forming carbon of a carbon material for use as a catalyst carrier as the carbon with low aromaticity undergoes a high temperature heating step, so as to form a coarse crystallized material as described above. Such a mechanism has also been confirmed by the fact that the formation and inclusion of the crystallized material may be mitigated by reduction of the blow-in amount of an acetylene gas in the acetylide producing step described below.

With respect to a carbon material for use as a catalyst carrier containing a crystallized material due to generation of such carbon with low aromaticity (soot), namely a carbon material for use as a catalyst carrier in which the yield at a classification treatment is comparatively as low as from 80 to 90%, a sharp second peak appears in the vicinity of a diffraction peak of 25.5° to 26.5° in the diffraction peak of the (002) plane obtained by a powder X-ray diffraction measurement on the carbon material for use as a catalyst carrier heated in an inert atmosphere at 2050° C. for 1 hour.

It has been ascertained that the very second peak is attributable to the crystallized material having high crystallinity and low porosity, and also that the yield at a classification treatment is improved substantially, as the peak intensity (the content of a crystallized material described below) decreases. The carbon with low aromaticity (soot) has a low melting temperature, and is conceivably easily graphitizable carbon, which is easily crystallized by a heat treatment. It has been known that most of easily graphitizable carbon graphitizes suddenly from about 2000° C. [Tetsuo Iwashita, New-Introduction to Carbon Materials (edit. The Carbon Society of Japan (1996) pp. 24-31], and the carbon with low aromaticity (soot) conceivably exhibits similar crystallization behavior.

Meanwhile, from studies by the present inventors it has been found that the carbon with high aromaticity forming the skeleton of a carbon material for use as a catalyst carrier crystallizes abruptly near 2100° C. Consequently, the carbon is calcined at 2050° C. for 1 hour in an inert atmosphere as standard, and it has been found that a sharp second peak near the diffraction angle of 25.5° to 26.5° obtained in a powder X-ray diffraction measurement is attributable to crystallized carbon with low aromaticity (soot). In addition, it has been also found that the content of the crystallized material described below determined using the peak intensity correlates with the content of the carbon with low aromaticity (soot).

Patent Literature 1 discloses a carbon material for use as a catalyst carrier characterized in that a dendritic mesoporous carbon structure having a three-dimensional structure in which a rod-shaped body or a ring-shaped body containing carbon is branched is heat-treated at from 1600 to 2200° C. to have a peak with a half-value width of from 0.1 to 1.0° between 25.5° and 26.5°. However it has been believed that the peak between 25.5° and 26.5° shown in this Patent Literature 1 is attributable to a layered structure of graphene developed by a heat treatment of carbon with high aromaticity, which eventually forms the skeleton of a carbon material for use as a catalyst carrier. Therefore, it was absolutely unforeseen that the peak appeared between the diffraction angle of 25.5° and 26.5° indicates in reality a crystallized material derived from carbon with low aromaticity (soot).

Furthermore, for suppressing generation of such a crystallized material, it was focused on the inference that the carbon having low aromaticity (soot) is generated by carbonization in a decomposition process of an acetylene gas which is blown in excessively at the acetylide producing step and adsorbed on silver acetylide. Based on the inference, intensive investigations on the amount of blown in acetylene gas were made to find that by suppressing the amount of acetylene gas adsorbed on silver acetylide, the generation of carbon having low aromaticity (soot) may be suppressed, and in consequence generation of coarse particles after a heat treatment step may be suppressed.

In contrast to the conventional thinking that unreacted silver ions leading to yield decrease and cost increase should be consumed fully by introducing an acetylene gas into the reaction system excessively beyond the molar equivalent (acetylene/silver nitrate=0.5) as described above, this novel strategy is rather to decrease the amount of the blown-in acetylene gas to slightly below the molar equivalent (acetylene/silver nitrate=0.5). It is quite unexpected that a carbon material for use as a catalyst carrier, with which formation and inclusion of the crystallized material can be suppressed to the extent possible, and the yield at the classification treatment may be improved, while the negative influence of unreacted silver ions on the cost increase is minimized and the characteristics required for a catalyst carrier (specific surface area, mesopore volume, durability, etc.) are maintained, may be yielded by reducing the amount of the blown-in acetylene gas. Based on these findings, the present inventors have completed the present disclosure.

The present disclosure has been made based on the respective findings above, and an object thereof is to provide a carbon material for use as a catalyst carrier which is suitable for producing a catalyst of a polymer electrolyte fuel cell, and with which generation of the crystallized material may be suppressed to the extent possible, the yield at the classification treatment may be excellent, and further the characteristics required for use as a fuel cell (specific surface area, mesopore volume, durability, etc.) are also superior.

Still another object of the present disclosure is to provide a method of producing a carbon material for use as a catalyst carrier, which is useful for producing a catalyst of such a polymer electrolyte fuel cell, and which yield at a classification treatment is excellent.

Solution to Problem

That is, the present disclosure includes the following aspects.

[1] A carbon material for use as a catalyst carrier for a polymer electrolyte fuel cell, the carbon material being a porous carbon material and satisfying the following (1), (2), (3), and (4) at the same time:
  (1) a content of a crystallized material defined below is 1.6 or less,
    wherein the content of a crystallized material is determined by [(C/A)−(B/A)], when the carbon material for use as a catalyst carrier is heated at 2050° C. in an inert atmosphere for 1 hour and powder X-ray diffractometry is performed, and an intensity value of an intersection of a baseline of a diffraction peak of a (002) plane and a perpendicular dropped from a second peak appearing near a diffraction angle of 25.5° to 26.5° in the diffraction peak of the (002) plane is defined as an A value, an intensity value of an intersection of a baseline of the second peak near the diffraction angle of 25.5° to 26.5° and the perpendicular dropped from the second peak near the diffraction angle of 25.5° to 26.5° is defined as a B value, and an intensity of the second peak near the diffraction angle of 25.5° to 26.5° is defined as a C value;
  (2) a BET specific surface area obtained by a BET analysis of a nitrogen gas adsorption isotherm is from 400 to 1500 m$^2$/g;
  (3) a cumulative pore volume $V_{2-10}$ with respect to a pore diameter of from 2 to 10 nm obtained by an analysis of a nitrogen gas adsorption isotherm using the Dollimore-Heal method is from 0.4 to 1.5 mL/g; and
  (4) a nitrogen gas adsorption amount $V_{macro}$ between a relative pressure of 0.95 and 0.99 in a nitrogen gas adsorption isotherm is from 300 to 1200 cc (STP)/g.

[2] The carbon material for use as a catalyst carrier for a polymer electrolyte fuel cell according to [1] above, wherein a half-value width ΔG of a G-band detected in a range of from 1550 to 1650 cm$^{-1}$ of a Raman spectrum is from 50 to 70 cm$^{-1}$.

[3] The carbon material for use as a catalyst carrier for a polymer electrolyte fuel cell according to [1] or [2] above, wherein the $V_{2-10}$ is from 0.5 to 1.0 mL/g.

[4] The carbon material for use as a catalyst carrier for a polymer electrolyte fuel cell according to any one of [1] or [3] above having a three-dimensional dendritic structure in which a rod-shaped body or a ring-shaped body is branched three-dimensionally.

[5] A method of producing a carbon material for use as a catalyst carrier for a polymer electrolyte fuel cell, the method including:
  a silver acetylide producing step of blowing an acetylene gas into a reaction solution composed of an aqueous ammonia solution of silver nitrate to synthesize silver acetylide,
  a decomposition step of causing a self-decomposing and explosive reaction of the silver acetylide to yield a carbon material intermediate,
  a washing treatment step of bringing the carbon material intermediate into contact with a nitric acid solution to clean the carbon material intermediate, and
  a heat treatment step of heat-treating the cleaned carbon material intermediate in a vacuum, or an inert gas atmosphere at a temperature of from 1400 to 2100° C. to yield a carbon material for use as a catalyst carrier;
  wherein in the silver acetylide producing step the acetylene gas is blown into the reaction solution such that an amount-of-substance ratio (acetylene/silver nitrate) of the acetylene gas to the silver nitrate is from 0.370 to 0.500.

[6] The method of producing a carbon material for use as a catalyst carrier for a polymer electrolyte fuel cell according to [5], wherein in the silver acetylide producing step the acetylene gas is blown into the reaction solution such that the amount-of-substance ratio (acetylene/silver nitrate) of the acetylene gas to the silver nitrate is from 0.400 to 0.500.

Advantageous Effects of Invention

With the carbon material for use as a catalyst carrier of the present disclosure, a carbon material for use as a catalyst carrier, which exhibits excellent yield at a classification treatment, as described above, by reason of suppression of generation of a coarse crystallized material to the extent possible, and also is suitable for producing a catalyst of a polymer electrolyte fuel cell superior in characteristics required for use as a fuel cell (specific surface area, mesopore volume, durability, etc.), may be provided.

Further, according to the producing method of the present disclosure, it is possible to provide a method of producing a carbon material for use as a catalyst carrier which is suitable for producing a catalyst of a polymer electrolyte fuel cell, and exhibits excellent yield at a classification treatment.

BRIEF DESCRIPTION OF THE DRAWINGS

FIG. 1 is an explanatory view (photograph) showing a crystallized material (inside a white dotted line) which is confirmed by TEM observation of a carbon material for use as a catalyst carrier of Experimental Example 27 of the present disclosure.

FIG. 2 is a diagram for explaining a method of obtaining A value, B value, and C value respectively from a powder X-ray diffraction spectrum in determining the content of crystallized material of the present disclosure.

FIG. 3 is powder X-ray diffraction spectra of Experimental Example 5, Test Example 7, and Test Example 8 of the present disclosure.

FIG. 4 is powder X-ray diffraction spectra of Experimental Example 26, Experimental Example 27, Experimental Example 28, Experimental Example 29, and Experimental Example 30 of the present disclosure.

FIG. 5A is an explanatory view (photograph) for showing a dendritic structure which is recognized when SEM observation is performed on the carbon material for use as a catalyst carrier of Experimental Example 5 of the present disclosure (The bar at the lower right in the figure shows 1 μm).

FIG. 5B is an explanatory view (photograph) for showing a dendritic structure which is recognized when SEM observation is performed on the carbon material for use as a catalyst carrier of Experimental Example 5 of the present disclosure (The bar at the lower right in the figure shows 5 μm).

FIG. 6 is a diagram for explaining a method of measuring a branch diameter of a carbon material for use as a catalyst carrier of the present disclosure.

DESCRIPTION OF EMBODIMENTS

A carbon material for use as a catalyst carrier of a polymer electrolyte fuel cell of the present disclosure, and a method of producing the same will be described below in detail.

A carbon material for use as a catalyst carrier of a polymer electrolyte fuel cell of the present disclosure is a porous carbon material, which satisfies the following (1), (2), (3) and (4) at the same time.

(1) The content of a crystallized material defined below is 1.6 or less;

wherein the content of a crystallized material is determined by [(C/A)−(B/A)], when the carbon material for use as a catalyst carrier is heated at 2050° C. in an inert atmosphere for 1 hour and powder X-ray diffractometry is performed, and the intensity value of an intersection of the baseline of a diffraction peak of the (002) plane and the perpendicular dropped from a second peak appearing near the diffraction angle of 25.5° to 26.5° in the diffraction peak of the (002) plane is defined as A value, the intensity value of an intersection of the baseline of the second peak near the diffraction angle of 25.5° to 26.5° and the perpendicular dropped from the second peak near the diffraction angle of 25.5° to 26.5° is defined as B value, and the intensity of the second peak near the diffraction angle of 25.5° to 26.5° is defined as C value;

(2) the BET specific surface area obtained by a BET analysis of a nitrogen gas adsorption isotherm is from 400 to 1500 m²/g;

(3) the cumulative pore volume $V_{2\text{-}10}$ with respect to a pore diameter of from 2 to 10 nm obtained by an analysis of a nitrogen gas adsorption isotherm using the Dollimore-Heal method is from 0.4 to 1.5 mL/g, and (4) the nitrogen gas adsorption amount $V_{macro}$ between a relative pressure of 0.95 and 0.99 in a nitrogen gas adsorption isotherm is from 300 to 1200 cc (STP)/g.

First of all, the above (1) refers to that in a carbon material for use as a catalyst carrier of the present disclosure, formation and inclusion of coarse massive carbon (crystallized material) leading to decrease in the yield at a classification treatment are suppressed to the extent possible. Then, as a method of indicating the content of such a crystallized material, the powder X-ray diffraction method was used after heating the carbon material for use as a catalyst carrier in an inert atmosphere at 2050° C. for 1 hour.

In this regard, the meaning of heating in an inert atmosphere at 2050° C. for 1 hour is, although already described above, as follows. The carbon with low aromaticity (soot) is conceivably easily graphitizable carbon, which is easily crystallized by a heat treatment, and it has been known that most of easily graphitizable carbon graphitizes rapidly from about 2000° C. [Tetsuo Iwashita, New-Introduction to Carbon Materials (edit. The Carbon Society of Japan (1996) pp. 24-31], and the carbon with low aromaticity (soot) conceivably exhibits similar crystallization behavior. Meanwhile, it has been found that the carbon with high aromaticity forming the skeleton of a carbon material for use as a catalyst carrier crystallizes abruptly near 2100° C. Further, in a case where the temperature of the heat treatment step itself, which will be described below, is relatively low, namely as low as 2000° C. or less, even if the carbon having low aromaticity (soot) formed and included therein, a crystallized material is hardly formed. Despite such a situation, it has been still found that the degree of formation of carbon having low aromaticity (soot) may be actually determined and verified as an evaluation of the obtained carbon material for use as a catalyst carrier.

As indicated in FIGS. 2, 3, and 4 described below, a relatively gentle diffraction peak of the (002) plane corresponding to carbon consisting of several layers of randomly stacked graphene sheets appears near the diffraction angle range of from 20° to 30° in the obtained powder X-ray diffraction spectrum. A sharp peak appearing therein near the diffraction angle of from 25.5 to 26.5° (herein occasionally referred to as a "second peak") is known as a diffraction peak derived from a graphite structure. In the present disclosure, this sharp peak appearing near the diffraction angle of from 25.5 to 26.5° is deemed as a peak indicating a crystallized material, and this intensity is defined as as the C value. However, since the intensity of the peak of a crystallized material and the intensity of a component corresponding to carbon consisting of several layers of randomly stacked graphene sheets are superimposed to give the C value, it is necessary to separate them.

Meanwhile, with respect to the A value in the present disclosure, the intensity value of an intersection of the perpendicular dropped from the sharp second peak appearing near the diffraction angle of 25.5° to 26.5° and the line connecting the relatively gentle spectrum point of the (002) plane at the diffraction angle of 15° and the same at the diffraction angle of 35° is defined as A value. The line connecting the spectrum point of the (002) plane at the diffraction angle of 15° and the same at the diffraction angle of 35° represents the baseline of the diffraction peak of the (002) plane (denoted as BL1 in FIG. 2).

With respect to the B value in the present disclosure, first translating parallel the line connecting the spectrum point at the diffraction angle of 15° and the same at the diffraction angle of 35° in the Y-axis direction to the intersection of the powder X-ray diffraction spectrum with the perpendicular at the diffraction angle of 25° to draw the baseline (denoted as BL2 in FIG. 2) of the second peak near the diffraction angle of 25.5° to 26.5°, the intensity value of an intersection of the baseline of the second peak with the perpendicular dropped from the second peak is defined as B value. The B value represents the intensity of a component corresponding to carbon consisting of several layers of randomly stacked graphene sheets.

In this regard, "near the diffraction angle of 25.5° to 26.5°" means that the diffraction angle is in a range of "from 25.5°−0.5° to 26.5°+0.5°".

Then, based on the intensity ratio (C/A) of the C value to the A value, a value superimposing the intensity of the peak indicating a crystallized material and the intensity of a component corresponding to carbon consisting of several layers of randomly stacked graphene sheets eliminating the influence of the baseline is found. Also, based on the intensity ratio (B/A) of the B value to the A value, the intensity of the peak indicating a crystallized material, and the intensity of a component corresponding to carbon consisting of several layers of randomly stacked graphene sheets eliminating the influence of the baseline are to be found. Then the content of a crystallized material [(C/A)–(B/A)] calculated from the difference between the two is an indicator of the intensity solely relevant to the peak attributable to a crystallized material, and represents that the existing amount of a crystallized material is low. Such concept and means were created because the crystallized material may be expressed with high reproducibility and also with good correlation with the content at a classification as demonstrated in Examples described below.

It is preferable that formation and inclusion of such a crystallized material in a carbon material for use as a catalyst carrier according to the present disclosure is suppressed to the extent possible in order to keep the yield high at a classification treatment. Therefore, it is required that [(C/A)–(B/A)] indicating the content of a crystallized material should be as low as possible, namely the content of a crystallized material [(C/A)–(B/A)] is required to be 1.6 or less, preferably 1.5 or less, more preferably 1.4 or less, and most preferably the content of a crystallized material is as close to zero as possible. When the content of a crystallized material [(C/A)–(B/A)] becomes so high beyond 1.6, there arises a risk that the amount of the crystallized material becomes too high and the yield at a classification treatment may decrease. Further, since catalyst particles supported on a crystallized material exhibit weak interaction with the surface of the carbon material, there arises another risk that they may fall off and aggregate more easily.

In this regard, it has been known that the degree of crystallinity of a carbon material generally depends on the heat treatment temperature, and in a case where a carbon material for use as a catalyst carrier has been heat-treated in an inert atmosphere at 2050° C. or higher, even when it is heat-treated in an inert atmosphere at 2050° C., this has little influence on the degree of crystallinity, and the content of a crystallized material [(C/A)–(B/A)] does not change.

Meanwhile, the content of a crystallized material is a value measured by the measuring method shown in Examples described below.

For the carbon material for use as a catalyst carrier according to the present disclosure, it is necessary that the BET specific surface area determined by a BET analysis of a nitrogen gas adsorption isotherm as described in (2) above is from 400 to 1500 m$^2$/g, and preferably from 500 m$^2$/g to 1,400 m$^2$/g. When the BET specific surface area is 400 m$^2$/g or more, and preferably 500 m$^2$/g or more, the catalyst metal particles with a size of several nanometers are supported in a well dispersed state, namely in a state where individual particles can exist keeping a certain interparticle distance among the catalyst metal particles. On the contrary, when the BET specific surface area is less than 400 m$^2$/g, the interparticle distance among the catalyst metal particles becomes too short, and it may become difficult to support the catalyst metal particles at a high density and uniformly. As a result, the effective area of the catalyst metal particles may decrease and the fuel cell characteristics may greatly deteriorate. Meanwhile, when the same exceeds 1500 m$^2$/g, since the edge portion in a porous carbon material increases, there arises a risk that decrease in practical crystallinity occurs and the durability tends to be lowered.

The BET specific surface area is a value measured by the measuring method shown in Examples described below.

Furthermore, for the carbon material for use as a catalyst carrier according to the present disclosure as described in (3) above, it is necessary that the cumulative pore volume $V_{2\text{-}10}$ with respect to a pore diameter of from 2 to 10 nm obtained by an analysis of a nitrogen gas adsorption isotherm using the Dollimore-Heal method is from 0.4 to 1.5 mL/g, and preferably from 0.5 to 1.0 mL/g. When the pores have a size of from 2 to 10 nm, catalyst metal fine particles usually adjusted to have a diameter of several nanometers, are dispersed in the pores in a highly dispersed state, which contributes favorably to the catalyst utilization rate. In a case where the pore volume $V_{2\text{-}10}$ is less than 0.4 mL/g, the volume with respect to the pore area is so small, that the average pore size becomes small. When the platinum fine particles as the catalyst metal are supported in the pores, the gaps between the pore wall and the platinum fine particles become small, so that the gas diffusion is reduced and there arises a risk that the high current characteristics may be deteriorated. On the contrary, in a case where $V_{2\text{-}10}$ exceeds 1.5 mL/g, the skeleton as a carbon material for use as a carrier becomes thin and the oxidation exhaustion resistance decreases. At the same time, the skeleton of the carbon material for use as a carrier is easily destroyed by stirring necessary for preparing a catalyst layer ink for preparing a catalyst layer, and characteristics derived from the shape may not be exhibited.

The cumulative pore volume $V_{2\text{-}10}$ is a value measured by the measurement method shown in Examples described below.

Further, with respect to a carbon material for use as a catalyst carrier of the present disclosure, from the viewpoint of improving the crystallinity, and the durability in an environment using a fuel cell, the half-value width $\Delta G$ of a G-band detected in a range of from 1550 to 1650 cm$^{-1}$ of a Raman spectrum is preferably from 50 to 70 cm$^{-1}$, and more preferably from 50 to 65 cm$^{-1}$. It is said that the $\Delta G$ represents an expanse of the carbon layer plane of a carbon material, and when $\Delta G$ is less than 50 cm$^{-1}$, the carbon layer plane extends excessively so that the area of edge portions of the carbon layer plane forming pore walls decreases, and the support property for catalyst metal particles on the pore walls tends to deteriorate. On the contrary, if it exceeds 70 cm$^{-1}$, the carbon layer plane is narrow so that the area of edge portions of the carbon layer plane liable to oxidative consumption increases, and therefore the durability tends to deteriorate.

The half value width $\Delta G$ of the G-band is a value measured by the measurement method shown in Examples described below.

Further, with respect to a carbon material for use as a catalyst carrier of the present disclosure, from the viewpoint of gas diffusibility inside the micropores formed in a catalyst layer, as in the above (4), the nitrogen gas adsorption amount $V_{macro}$ adsorbed between a relative pressure of 0.95 and 0.99 in a nitrogen gas adsorption isotherm is required to be from 300 to 1200 cc (STP)/g. The nitrogen gas adsorption amount $V_{macro}$ is more preferably from 300 to 800 cc (STP)/g. The nitrogen gas adsorption amount $V_{macro}$ between a relative pressure of 0.95 and 0.99 represents the size of macropores formed from the gaps among primary particles. When this value falls within the above range, the three-dimensional dendritic structure of a carbon material is highly developed. By developing the three-dimensional dendritic structure, when used in a fuel cell, a situation occurring due to insufficient supply of a raw material gas ($H_2$, or $O_2$), or due to poor discharge performance of generated $H_2O$ (situation where a cell reaction is hindered) may be avoided. Namely, a fuel cell with excellent high current characteristics can be formed. On the contrary, when the $V_{macro}$ exceeds 1200, the voids in a carbon material increase, so that the thickness of a catalyst layer increases when it is applied to a catalyst carrier for a fuel cell, and the diffusion distance of a raw material gas ($H_2$, or $O_2$) increases to deteriorate the power generation characteristics.

The nitrogen gas adsorption amount $V_{macro}$ is a value measured by the measurement method shown in Examples described below.

In a method of producing such a carbon material for use as a catalyst carrier according to the present disclosure, carbon with low aromaticity (soot) to be included in a carbon material intermediate obtained by self-decomposing explosion of silver acetylide is required to be eliminated to the extent possible. As a result of the detailed investigations by the present inventors, the following findings were obtained. In order to eliminate the carbon having low aromaticity (soot) to the extent possible, if the generation of the aforedescribed carbon having low aromaticity (soot) itself is suppressed, it is possible to suppress formation of a crystallized material even after subsequent steps. From this point of view, as described above, the amount of an acetylene gas blown in at the silver acetylide producing step should be precisely controlled to the molar equivalent (acetylene/silver nitrate=0.5) or lower. By doing so, formation and inclusion of a crystallized material at a later stage can be suppressed, namely the content of a crystallized material defined as above in connection with a powder X-ray diffraction spectrum obtained by powder X-ray diffractometry after heating the carbon material for use as a catalyst carrier in an inert atmosphere at 2050° C. for 1 hour, may be decreased. As a result, the yield at a classification treatment can be increased.

The amount-of-substance ratio of the acetylene gas to the silver nitrate (acetylene/silver nitrate) is preferably 0.500 or less, and more preferably 0.498 or less. When the amount-of-substance ratio (acetylene/silver nitrate) is larger than 0.500, the amount of acetylene adsorbed on the formed silver acetylide becomes excessive, and carbon with low aromaticity (soot) derived from the adsorbed acetylene to be formed after the decomposition step is presumably increased. As a result, there is a risk that a large amount of a crystallized material is generated after the heat treatment step describe below, namely that the yield at the classification treatment may be lowered.

The lower limit of the amount-of-substance ratio (acetylene/silver nitrate) is preferably 0.370 or more because the presence of unreacted silver leads to increase in production cost, more preferably 0.400 or more, and further preferably 0.450 or more.

When the amount-of-substance ratio (acetylene/silver nitrate) is less than 0.37, the crystal size of the formed silver acetylide becomes small, and the specific surface area and the mesopore volume of porous carbon obtained by removing silver from a composite material made of silver obtained by decomposition and carbon become lower, and also the yield at a classification treatment becomes lower. This is presumably because the crystal size of silver acetylide decreases as the blow-in amount of an acetylene gas decreases, and therefore the total amount of energy which is generated in decomposition and propagates through the silver acetylide crystal decreases, so that the graphene layer does not develop sufficiently and the amount of carbon with low aromaticity (soot) increases.

Meanwhile, although there is no particular restriction on a method of adjusting the amount of an acetylene gas to be blown in at the acetylide producing step, namely a method of adjusting the molar ratio (acetylene/silver nitrate), the flow rate of the blown-in acetylene gas, or the blow time thereof should preferably be adjusted.

It is conjectured that formation of carbon with low aromaticity may be excluded to the extent possible by adjusting the amount of an acetylene gas in the silver acetylide producing step as described above. By doing so, formation and inclusion of a crystallized material is excluded to the extent possible, but in other aspects it is possible to prepare a carbon material for use as a catalyst carrier of the present disclosure by the same method as the conventional method.

In other words, a carbon material for use as a catalyst carrier of the present disclosure may be produced by blowing a predetermine amount of acetylene gas into a reaction solution composed of an aqueous ammonia solution of silver nitrate to synthesize silver acetylide (silver acetylide producing step), causing a self-decomposing and explosive reaction of the obtained silver acetylide at a temperature of from 120 to 400° C. to recover a carbon material intermediate (decomposition step), bringing the recovered carbon material intermediate into contact with a nitric acid solution to clean the carbon material intermediate by removing silver particles (washing treatment step), and heat-treating the cleaned carbon material intermediate in a vacuum, or an inert gas atmosphere at a temperature of from 1400 to 2100° C., and preferably 1800° C. to 2100° C. (heat treatment step). Each step will be described in detail below.

(Silver Acetylide Producing Step)

In the present disclosure, the silver acetylide producing step is carried out by adjusting the amount-of-substance ratio of acetylene gas to the silver nitrate as described above. Examples of the contacting method of the acetylene gas include a method in which an acetylene gas flows through a silver nitrate aqueous solution, or more specifically, a method in which the acetylene gas is blown into a silver nitrate aqueous solution. During contact between the silver nitrate aqueous solution and the acetylene gas, the silver nitrate aqueous solution may be irradiated with ultrasonic waves. This means has an effect to promote dissolution or dispersion of the acetylene gas into the silver nitrate aqueous solution. During such contact between the silver nitrate aqueous solution and the acetylene gas, it is preferable to stir the silver nitrate aqueous solution. Since the contact frequency between the acetylene gas and the silver nitrate aqueous solution is increased by this means, silver acetylide is formed efficiently. The stirring may be conducted using a general stirring blade, or using a stirring bar for a magnetic stirrer. As a result, silver acetylide can be obtained as a bulky precipitate of white crystals.

(Decomposition Step)

Next, the obtained silver acetylide is decomposed by heating to obtain a carbon material intermediate. By heating silver acetylide, silver acetylide explodes on the nanoscale, and phase separation to silver and carbon occurs, during which silver forms nanosized particles, or is gasified by a reaction heat to erupt to the surface. Since three acetylenic compounds such as acetylene molecules are apt to form together a benzene ring, the carbon has a structure with high aromaticity. Further, silver forms nanoparticles, and therefore a carbon phase having eliminated silver becomes a porous structure.

Heating of silver acetylide may be carried out, for example, as follows. The obtained precipitate of silver acetylide is heated in a reduced pressure atmosphere, for example, between 40° C. and 100° C. (hereinafter referred to as "first heat treatment"). By this heating, the solvent of the reaction solution remaining in the silver acetylide can be removed, so that waste of thermal energy of explosion as the sensible heat of the phase transition of the solvent to the gas phase may be prevented, and the decomposition of silver acetylide can be performed efficiently. In this regard, at the aforementioned temperature silver acetylide does not decompose.

Next, the silver acetylide from which the solvent has been removed is heated, for example, between 140° C. and 400° C. (hereinafter referred to as "second heat treatment"). By heating silver acetylide to such a relatively high temperature, silver acetylide explodes on the nanoscale and decomposes, and silver and carbon form nanostructures, respectively. Thus, a carbon material intermediate containing silver and carbon is obtained.

The basic structure of a carbon phase portion of the composite material is mainly composed of several layers of graphene through polycyclic aromatic formation from acetylenic compounds as described above. Further, since in the above composite material, silver forms nanoscale particles in the explosion process, a carbon material from which silver particles are removed can form a carbon material having a large specific surface area and high porosity.

(Washing Treatment Step)

For removing silver from a carbon material intermediate, a publicly known method may be used. For example, a cleaned carbon material intermediate, in which silver remaining on the surface or inside of the carbon material intermediate is removed by, for example, immersing the carbon material intermediate containing silver and carbon in hot nitric acid to dissolve silver, may be obtained (Heat Treatment Step)

The cleaned carbon material intermediate is heat-treated in a vacuum, or an inert gas atmosphere at a temperature of from 1400 to 2100° C. and preferably from 1800 to 2100° C. (hereinafter also referred to as "third heat treatment") to yield a carbon material for use as a catalyst carrier. The crystal of the carbon material for use as a catalyst carrier may be grown by the heat treatment performed in this step, and the crystallinity of the carbon material for use as a catalyst carrier may be adjusted or regulated by the calcination temperature. When the carbon material for use as a catalyst carrier is used, for example, as a catalyst carrier for an electrode of a polymer electrolyte fuel cell, the porous carbon material is exposed to an environment, where the temperature is relatively high, for example, about 80° C., the acidity is strongly acidic with a pH of 1 or less, and the potential is as high as 1.3 V vs SHE. In such an environment, carbon in the porous carbon material tends to be oxidatively consumed. Therefore, when the porous carbon material is used as a catalyst carrier, it is important that the crystallinity should be enhanced in this step.

As described above, when the temperature of the heat treatment step exceeds 2100° C., even in the carbon with high aromaticity, which will eventually form the skeleton of a carbon material for use as a catalyst carrier, crystallization suddenly advances. Therefore, in the subsequent classification step, crushing or pulverization becomes hardly performable, and the yield at a classification treatment may decrease. Therefore, the temperature of the heat treatment step is preferably 2100° C. or less. The lower limit of the temperature at the heat treatment step needs to be 1400° C. or higher, and preferably 1800° C. or higher from the viewpoint of improving the durability ($\Delta G$ as mentioned above) of a carbon material for use as a catalyst carrier to be yielded.

The heat treatment step may be, for example but without limitation thereto, performed in a reduced pressure atmosphere, or in an inert gas atmosphere, and preferably in an inert gas atmosphere. There is no particular restriction on an inert gas, and, for example, nitrogen, or argon may be used.

A carbon material for use as a catalyst carrier of the present disclosure is as a catalyst carrier preferably composed of dendritic carbon nanostructures having a three-dimensional dendritic structure in which a rod-shaped body or a ring-shaped body is branched three-dimensionally. This dendritic carbon nanostructure is not only equivalent or superior to the conventional similar dendritic carbon nanostructure in the BET specific surface area and durability, but also freed from a coarse crystallized material to the extent possible as described above. Therefore, the dendritic carbon nanostructure can further increase the yield at the classification treatment, and further, in a catalyst layer prepared using the carbon material as a catalyst carrier, mesopores suitable for diffusing a reactive gas without resistance, and discharging the water produced in the catalyst layer (produced water) without delay, may be formed, and moreover a polymer electrolyte fuel cell, with which there is little risk that the utilization ratio of a catalyst metal decreases, and which is superior in the durability as a fuel cell, may be obtained.

In this regard, a dendritic carbon nanostructure represents a dendritic structure with branching having, for example, a branch diameter of from 10 nm to several 100s of nanometers (for example, 500 nm or less (preferably 200 nm or less)).

The branch diameter is measured as follows. Using a scanning electron microscope (SEM; SU-9000 manufactured by Hitachi High-Technologies Corporation), SEM images at 5 visual fields (size 2.5 μm×2 μm) were observed at 100000-fold magnification, and branch diameters were measured at 20 positions in each visual field, and the mean value of total 100 measurements is regarded as the branch diameter. The branch diameter to be measured is the branch diameter at the center between the adjacent two branch points (the middle part of the branched branch) of a branch of interest (refer to FIG. 5A, D in FIG. 5A stands for a branch diameter).

Referring to FIG. 6, the method of measuring a branch diameter will be described. In FIG. 6, one branch of interest is shown. For this branch of interest, the branch point BP 1 and the branch point BP 2 are specified. Next the specified branch point BP 1 and branch point BP 2 are connected with a line segment, and the thickness (width) of the branch is measured on the perpendicular bisector BC of the line segment connecting the branch point BP 1 and the branch point BP 2. The measured thickness (width) of the branch is a branch diameter D at one position,

EXAMPLES

A carbon material for use as a catalyst carrier of the present disclosure and the production method therefor will be specifically described based on Experimental Examples.

A powder X-ray diffraction measurement [content of crystallized material], and the measurements of the BET specific surface area (m²/g), the cumulative pore volume $V_{2-10}$ with respect to a pore diameter of from 2 to 10 nm, the nitrogen gas adsorption amount $V_{macro}$ [cc (STP)/g], the half value width $\Delta G$ (cm$^{-1}$) of the G band detected in a range of from 1550 to 1650 cm$^{-1}$ of the Raman spectrum, and the yield (%) at the classification treatment of carbon materials for use as a catalyst carrier prepared in the following Experimental Examples were respectively conducted as follows. Further, part of the obtained carbon materials for use as a catalyst carrier were observed using a transmission electron microscope (TEM) and a scanning electron microscope (SEM).

<Measurement of Powder X-Ray Diffraction Spectrum (Content of Crystallized Material)>

From the sample prepared in each of the following Experimental Examples, which was heat-treated in an argon atmosphere at 2050° C. for 1 hour, approximately 3 mg was weighed out. Then this sample was packed compactly on a glass sample plate (outer size 35×50 mm, thickness 2 mm, sample section 20×20, sample section depth 0.5 mm; produced by Rigaku Corporation) and leveled off such that the upper surface of the sample becomes flush with the upper surface of the glass. The sample was mounted on an X-ray diffractometer (RINT-TTRIII, manufactured by Rigaku Corporation), and the powder X-ray diffraction spectrum was measured using Cu-Kα as a radiation source at normal temperature, a scanning step of 0.02°, and an angle sweeping rate of 1°/min. The obtained spectra are as shown in FIGS. 2 to 4. Although the diffraction peak position of the (002) plane of a graphite crystal is ordinarily at a diffraction angle (2θ) of about 26.5°, in the present disclosure, the diffraction peak of the (002) plane of graphite or high-crystalline carbon similar thereto appeared between 20° and 30°, and a sharp peak corresponding to a crystallized material was observed near the diffraction angle of from 25.5 to 26.5°. From the obtained powder X-ray diffraction spectrum, the intensities corresponding to the A value, the B value and the C value were respectively determined according to FIG. 2 to calculate a content of a crystallized material [(C/A)−(B/A)].

The intensities of A, B and C in the calculation of a content of crystallized material are based on the zero point of the spectrum. For example, when only the glass sample plate is measured, the diffraction intensity of the glass sample plate compared to the diffraction intensity of carbon is sufficiently small, and the influence of the sample plate on the spectrum may be ignored. On the other hand, when a background noise is included significantly as in the case where a sample plate gives diffraction intensity similar to that of the carbon spectrum, it is necessary that a spectrum obtained by measuring porous carbon, from which the influence of a background noise is eliminated appropriately, for example by subtracting the spectrum obtained in measuring the sample plate alone, should be used for calculating a content of crystallized material.

<Measurement of BET Specific Surface Area (m²/g), Cumulative Pore Volume $V_{2-10}$ with Respect to a Pore Diameter of from 2 to 10 nm, and Nitrogen Gas Adsorption Amount $V_{macro}$ [cc (STP)/g]>

About 30 mg of the carbon material for use as a catalyst carrier prepared in each Experimental Example described below was weighed as a sample, and was dried in a vacuum at 200° C. for 2 hours. Thereafter, a nitrogen gas adsorption isotherm was measured using an automatic specific surface area measuring apparatus (AUTOSORB iQ-MP manufactured by Quantachrome Instruments Japan G.K.) and a nitrogen gas as an adsorbate. A BET analysis was carried out at the relative pressure of the isotherm during adsorption was in the range of from 0.05 to 0.15, then a BET specific surface area was calculated.

Regarding the cumulative pore volume $V_{2-10}$ with respect to a pore diameter of from 2 to 10 nm, the similar nitrogen gas adsorption isotherm as above was used and it was analyzed and calculated by the Dollimore-Heal method (DH method) using the attached software.

Further, regarding the nitrogen gas adsorption amount $V_{macro}$, the difference between the adsorption amount [cc (STP)/g] at the relative pressure of 0.95 of the nitrogen gas adsorption isotherm similar to the above, and the adsorption amount [cc (STP)/g] at the relative pressure of 0.99 was calculated, and regarded as the value of $V_{macro}$ [cc (STP)/g].

<Half-Value Width ΔG ($Cm^{-1}$) of G-Band Detected in Range of from 1550 to 1650 $cm^{-1}$ of Raman Spectrum>

About 3 mg of the carbon material for use as a catalyst carrier prepared in each Experimental Example described below was weighed as a sample. Then the sample was mounted on a laser Raman spectrophotometer (model NRS-3100 manufactured by JASCO Corporation) to measure a Raman spectrum under measurement conditions: excitation laser: 532 nm, laser power: 10 mW (sample irradiation power: 1.1 mW), microscope arrangement: backscattering, slit: 100 μm×100 μm, objective lens: ×100, spot diameter: 1 μm, exposure time: 30 sec, observation wavenumber: from 2000 to 300 $cm^{-1}$, and cumulative number: 6. From the obtained six spectra, the half value widths ΔG ($cm^{-1}$) of the so-called G-bands of graphite appearing respectively in the vicinity of 1580 $cm^{-1}$ were determined, and the mean value thereof was regarded as a measured value. Rating was made according to the following criteria.

<TEM Observation>

In order to observe the appearance of a crystallized material, observation was carried out using a transmission electron microscope on the carbon material for use as a catalyst carrier prepared in Experimental Example 27 described below as a sample. The results are shown in FIG. 1.

<SEM Observation>

In order to observe the appearance of a dendritic structure, observation was carried out using a high resolution scanning electron microscope on the carbon material for use as a catalyst carrier prepared in Experimental Example 5 described below as a sample. The results are shown in FIG. 5A and FIG. 5B.

<Measurement of Yield at Classification Step>

For measuring the yield, as a pulverizing and classifying device, a jet mill SJ-100GMP manufactured by Nisshin Engineering Inc. was used. Each 100 g of the carbon materials for use as a catalyst carrier of Experimental Examples described below was subjected to the device for simultaneous pulverization and classification under the conditions: pulverization pressure of 0.8 MPa, and powder feed rate of 100 g/hr. The powder recovered on the collection filter cloth (filter powder), and the powder classified and not recovered on the collection filter cloth due to coarse size (cyclone powder) were collected and the respective weights were measured. Then, the yield (%) at the classification was calculated by the calculation formula of [(weight of filter powder)/(total weight of filter powder and cyclone powder)]×100. Rating was made according to the following criteria.

[Acceptable Rank]

Good: Yield is not less than 95%.

Fair: Yield is not less than 90% but less than 95%.

[Rejected Rank]

Poor: Yield is less than 90%.

Experimental Example 1

(1) Silver Acetylide Producing Step

By adding 200 g of a 25% by mass aqueous ammonia solution to 46 g of silver nitrate, the latter was dissolved. Then 2 L of water was further added thereto, and residual oxygen was removed by blowing dry nitrogen therein. Next, an acetylene gas was blown into the solution at a flow rate of 100 mL/min for 15 min with stirring and also applying vibration by immersing an ultrasonic vibrator to precipitate a solid of silver acetylide in the solution. Next, the yielded precipitate was filtered with a membrane filter, and in doing so the precipitate was rinsed with methanol, followed by addition of some methanol so that the precipitate was impregnated with methanol.

(2) Decomposition Process

Approximately 0.5 g of silver acetylide of each Experimental Example yielded in the above silver acetylide producing step in a state impregnated with methanol was placed in a stainless steel cylindrical container with a diameter of 5 cm. This was then placed in a vacuum dryer and dried in a vacuum at from 30 to 40° C. for 1 hour to prepare a silver particle-encapsulated intermediate derived from silver acetylide (first heat treatment).

Next, the silver particle-encapsulated intermediate obtained in the first heat treatment step at from 30 to 40° C. immediately after the vacuum drying was rapidly heated up to from 160 to 200° C. as it was without taking out it from the vacuum electric heating furnace, and the heating was continued for 20 min (second heat treatment). In this course, a nano-scale explosive reaction occurred in the container, and the encapsulated silver was ejected, and a silver-encapsulated nanostructure (carbon material intermediate) having a large number of craters formed on the surface as well as the inside was obtained as a composite material containing silver and carbon.

(3) Washing Treatment Step

Out of a carbon material intermediate composed of the composite material containing silver and carbon obtained in the second heat treatment, 10 g was dipped in 200 mL of a nitric acid solution having a concentration of 30% by mass to be washed at 90° C. for 2 hours to remove remaining silver particles. Next, nitric acid was removed from the carbon material intermediate after washing as above using a centrifuge, and in order to sufficiently remove residual nitric acid, the carbon material intermediate after the centrifugation was again dispersed in pure water which was centrifuged again to separate the carbon material intermediate (solid) from the liquid. By conducting such a water washing operation twice, a carbon material intermediate which was cleaned by removing nitric acid was obtained.

The cleaned carbon material intermediate was treated in an air atmosphere at 140° C. for 2 hours to remove moisture for drying, and then heat-treated in an argon stream at 1100° C. for 2 hours to yield a porous carbon material.

(4) Heat Treatment Step (Third Heat Treatment)

The temperature of the porous carbon material yielded in the above (3) was further raised at 15° C./min up to 2050° C. in an argon stream. After reaching a predetermined temperature, the temperature was maintained for 2 hours for a heat treatment to obtain a carbon material for use as a catalyst carrier according to Experimental Example 1.

With respect to the carbon material for use as a catalyst carrier prepared as above in Experimental Example 1, a powder X-ray diffraction measurement (content of crystallized material), and measurements of the BET specific surface area (m$^2$/g), the cumulative pore volume $V_{2-10}$ of pores having a pore size of from 2 to 10 nm, the nitrogen gas adsorption amount $V_{macro}$ [cc (STP)/g], the half-value width ΔG (cm$^{-1}$) of the G-band detected in a range of from 1550 to 1650 cm$^{-1}$ in a Raman spectrum, and the yield at a classification treatment (%) were carried out.

The results are shown in Table 1.

Experimental Examples 2 to 8

Respective carbon materials for use as a catalyst carrier were prepared in the same manner as in Experimental Example 1 and evaluated in the same manner, except that the acetylene gas blowing time in the silver acetylide producing step was changed to 20 min, 22 min, 23 min, 25 min, 27 min, 28 min, or 30 min, respectively. The results are shown in Table 1.

Experimental Examples 9 to 11

Respective carbon materials for use as a catalyst carrier were prepared in the same manner as in Experimental Example 1 and evaluated in the same manner, except that the temperature of the heat treatment step was changed to 2025° C., and the acetylene gas blowing time in the silver acetylide producing step was changed to 25 min, 28 min, or 30 min respectively. The results are shown in Table 1.

Experimental Examples 12 to 17

Respective carbon materials for use as a catalyst carrier were prepared in the same manner as in Experimental Example 1 and evaluated in the same manner, except that the temperature of the heat treatment step was changed to 2000° C., and the acetylene gas blowing time in the silver acetylide producing step was changed to 15 min, 20 min, 23 min, 25 min, 28 min, or 30 min respectively. The results are shown in Table 1.

Experimental Examples 18 to 20

Respective carbon materials for use as a catalyst carrier were prepared in the same manner as in Experimental Example 1 and evaluated in the same manner, except that the temperature of the heat treatment step was changed to 1900° C., and the acetylene gas blowing time in the silver acetylide producing step was changed to 25 min, 28 min, or 30 min respectively. The results are shown in Table 1.

Experimental Examples 21 and 22

Respective carbon materials for use as a catalyst carrier were prepared in the same manner as in Experimental Example 1 and evaluated in the same manner, except that the temperature of the heat treatment step was changed to 1800° C., and the acetylene gas blowing time in the silver acetylide producing step was changed to 28 min, or 30 min respectively. The results are shown in Table 1.

Experimental Examples 23 and 24

Respective carbon materials for use as a catalyst carrier were prepared in the same manner as in Experimental Example 1 and evaluated in the same manner, except that the temperature of the heat treatment step was changed to 1700° C., and the acetylene gas blowing time in the silver acetylide producing step was changed to 28 min, or 30 min respectively. The results are shown in Table 1.

Experimental Example 25

Respective carbon materials for use as a catalyst carrier were prepared in the same manner as in Experimental Example 1 and evaluated in the same manner, except that the temperature of the heat treatment step was changed to 1500° C., and the acetylene gas blowing time in the silver acetylide producing step was changed to 30 min. The results are shown in Table 1.

Experimental Examples 26 and 27

Respective carbon materials for use as a catalyst carrier were prepared in the same manner as in Experimental Example 1 and evaluated in the same manner, except that the acetylene gas blowing time in the silver acetylide producing step was changed to 32 min, or 35 min respectively. The results are shown in Table 2.

Experimental Examples 28 and 29

Respective carbon materials for use as a catalyst carrier were prepared in the same manner as in Experimental Example 1 and evaluated in the same manner, except that the temperature of the heat treatment step was changed to 2025° C., and the acetylene gas blowing time in the silver acetylide producing step was changed to 32 min, or 35 min. The results are shown in Table 2.

Experimental Examples 30 to 34

Respective carbon materials for use as a catalyst carrier were prepared in the same manner as in Experimental Example 1 and evaluated in the same manner, except that the temperature of the heat treatment step was changed to 2200° C., and the acetylene gas blowing time in the silver acetylide producing step was changed to 25 min, 28 min, 30 min, 32 min, or 35 min respectively. The results are shown in Table 2.

Experimental Examples 35 and 36

Respective carbon materials for use as a catalyst carrier were prepared in the same manner as in Experimental Example 1 and evaluated in the same manner, except that the temperature of the heat treatment step was changed to 2000° C., and the acetylene gas blowing time in the silver acetylide producing step was changed to 32 min, or 35 min respectively. The results are shown in Table 2.

Experimental Examples 37 and 38

Respective carbon materials for use as a catalyst carrier were prepared in the same manner as in Experimental Example 1 and evaluated in the same manner, except that the temperature of the heat treatment step was changed to 1900° C., and the acetylene gas blowing time in the silver acetylide producing step was changed to 32 min, or 35 min respectively. The results are shown in Table 2.

Experimental Examples 39 and 40

Respective carbon materials for use as a catalyst carrier were prepared in the same manner as in Experimental Example 1 and evaluated in the same manner, except that the temperature of the heat treatment step was changed to 1800° C., and the acetylene gas blowing time in the silver acetylide producing step was changed to 32 min, or 35 min respectively. The results are shown in Table 2.

Experimental Example 41

Respective carbon materials for use as a catalyst carrier were prepared in the same manner as in Experimental Example 1 and evaluated in the same manner, except that the temperature of the heat treatment step was changed to 1700° C., and the acetylene gas blowing time in the silver acetylide producing step was changed to 32 min. The results are shown in Table 2.

Experimental Examples 42 and 43

Respective carbon materials for use as a catalyst carrier were prepared in the same manner as in Experimental Example 1 and evaluated in the same manner, except that the temperature of the heat treatment step was changed to 1500° C., and the acetylene gas blowing time in the silver acetylide producing step was changed to 32 min, or 35 min respectively. The results are shown in Table 2.

Experimental Example 44

Respective carbon materials for use as a catalyst carrier were prepared in the same manner as in Experimental Example 1 and evaluated in the same manner, except that the temperature of the heat treatment step was changed to 2300° C., and the acetylene gas blowing time in the silver acetylide producing step was changed to 25 min. The results are shown in Table 2.

Experimental Examples 45 and 46

Respective carbon materials for use as a catalyst carrier were prepared in the same manner as in Experimental Example 1 and evaluated in the same manner, except that the temperature of the heat treatment step was changed to 2300° C., and the acetylene gas blowing time in the silver acetylide producing step was changed to 30 min, or 35 min respectively. The results are shown in Table 2.

Experimental Example 47

Respective carbon materials for use as a catalyst carrier were prepared in the same manner as in Experimental Example 1 and evaluated in the same manner, except that the temperature of the heat treatment step was changed to 1300° C., and the acetylene gas blowing time in the silver acetylide producing step was changed to 30 min. The results are shown in Table 2.

Experimental Example 48

Respective carbon materials for use as a catalyst carrier were prepared in the same manner as in Experimental Example 1 and evaluated in the same manner, except that the temperature of the heat treatment step was changed to 1100° C., and the acetylene gas blowing time in the silver acetylide producing step was changed to 30 min. The results are shown in Table 2.

Experimental Examples 49 to 51

In addition, a commercially available porous carbon material was examined in Experimental Examples 49 to 51.

As a commercially available porous carbon material, KETJENBLACK EC600JD produced by Lion Specialty Chemicals Co., Ltd., which is a porous carbon having a dendritic structure with well-developed pores, and a large specific surface area, was heated in an argon stream up to 1400° C. at a temperature elevation rate of 15° C./min. After reaching a predetermined temperature, the temperature was maintained for 2 hours for a heat treatment to obtain a carbon material for use as a catalyst carrier according to Experimental Example 49.

Carbon materials for use as a catalyst carrier according to Experimental Examples 50 and 51 were prepared in the same manner as in Experimental Example 49, except that the temperature of the heat treatment step was changed to 1800° C. or 2000° C.

With respect to the carbon materials for use as a catalyst carrier of Experimental Examples 49 to 51 prepared as described above, measurements of the BET specific surface area (m²/g), the cumulative pore volume $V_{2-10}$ of pores having a pore size of from 2 to 10 nm, the nitrogen gas adsorption amount $V_{macro}$ [cc (STP)/g], the half-value width $\Delta G$ (cm$^{-1}$) of the G-band detected in a range of from 1550 to 1650 cm$^{-1}$ in a Raman spectrum were carried out by the methods described above.

Meanwhile, with respect to the carbon materials for use as a catalyst carrier of Experimental Examples 49 to 51 (calcined products of Ketjenblack), a peak was not detected near the diffraction angle of from 25.5 to 26.5° in the powder X-ray diffraction spectrum.

<Preparation of Catalyst, Production of Catalyst Layer, Preparation of MEA, Assembly of Fuel Cell, and Evaluation of Battery Performance (Durability)>

Next, using each of the thus prepared carbon materials for use as a catalyst carrier after the classification treatment (provided that the carbon materials for use as a catalyst carrier of Examples 49 to 51 were not subjected to a classification treatment, but ground in an agate mortar for 5 min), catalysts for a polymer electrolyte fuel cell, on which a catalyst metal was supported, were prepared as described below. Further, using an obtained catalyst, an ink solution for a catalyst layer was prepared. Next, using the ink solution for a catalyst layer, a catalyst layer was formed, and using the formed catalyst layer a membrane electrode assembly (MEA) was produced. The produced MEA was fitted into a fuel cell, and a power generation test was performed using a fuel cell measuring device. Preparation of each component and cell evaluation by a power generation test will be described in detail below.

(1) Preparation of Catalyst for Polymer Electrolyte Fuel Cell (Carbon Material Supporting Platinum)

Each carbon material for use as a catalyst carrier prepared as above was dispersed in distilled water, and formaldehyde was added to the dispersion. The dispersion was placed in a water bath set at 40° C., and when the temperature of the dispersion reached the water bath temperature of 40° C., an aqueous nitric acid solution of a dinitrodiamine Pt complex was slowly poured into the dispersion with stirring. Then, stirring was continued for about 2 hours, the dispersion was filtrated, and the obtained solid was washed. The solid obtained in this way was dried in a vacuum at 90° C., then pulverized in a mortar, and then heat-treated at 200° C. in an argon atmosphere containing 5% by volume of hydrogen for 1 hour to yield a carbon material supporting platinum catalyst particles. The supported platinum amount of the carbon material supporting platinum was regulated to 25% by mass with respect to the total mass of the carbon material for use as a catalyst carrier and the platinum particles, which was confirmed by a measurement based on inductively coupled plasma atomic emission spectrometry (ICP-AES).

(2) Preparation of Catalyst Layer

A catalyst layer ink liquid containing a mixture of a Pt catalyst and an electrolyte resin was prepared using the carbon material supporting platinum (Pt catalyst) prepared as described above, and Nafion® (produced by DuPont Co., Ltd., persulfonic acid-based ion exchange resin) as an electrolyte resin; mixing the Pt catalyst and the Nafion in a argon atmosphere, such that the mass of the Nafion solid component is 1.0 times as much as the mass of the carbon material supporting platinum catalyst particles, and 0.5 times as much as non-porous carbon; stirring gently; then crushing the Pt catalyst by ultrasonic waves; and further adjusting the mixture to 1.0% by mass in terms of total solid concentration of the Pt catalyst and the electrolyte resin by adding ethanol.

To each catalyst layer ink solution having a solid concentration of 1.0% by mass thus prepared, ethanol was further added to prepare a catalyst layer ink solution for spray coating having a platinum concentration of 0.5% by mass. The catalyst layer ink solution for spray coating was sprayed on a Teflon® sheet after adjustment of spraying conditions such that the mass of platinum per unit area of catalyst layer (hereinafter referred to as "platinum basis weight") become 0.1 mg/cm$^{-1}$, and a drying treatment was carried out in argon at 120° C. for 60 min to complete a catalyst layer.

(3) Preparation of MEA

An MEA (membrane electrode assembly) was produced using the catalyst layer prepared as above by the following method.

A square electrolyte membrane of 6 cm on a side of was cut out from a Nafion membrane (NR 211 produced by DuPont Co., Ltd.).

Each of the anode or cathode catalyst layer coated on a Teflon® sheet was cut out with a cutter knife into a square of 2.5 cm on a side.

Between the anode catalyst layer and the cathode catalyst layer cut out as above, the electrolyte membrane was inserted such that the two catalyst layers sandwich the central part of the electrolyte membrane without misalignment from each other. Then the laminate was pressed at 120° C. under a pressure of 100 kg/cm$^{-1}$ for 10 min, cooled down to room temperature, and only the Teflon® sheets were peeled off carefully from the anode and the cathode to complete an assembly of the catalyst layers and the electrolyte membrane, in which the respective catalyst layers of anode and cathode are fixed to the electrolyte membrane.

Next, as a gas diffusion layer, a pair of square carbon paper sheets of 2.5 cm on a side were cut out from carbon paper (35 BC produced by SGL Carbon Co., Ltd.), and between the carbon paper sheets, the assembly of the catalyst layers and the electrolyte membrane was inserted such that the two catalyst layers of the anode and the cathode are placed without misalignment. Then the laminate was pressed at 120° C. under a pressure of 50 kg/cm$^{-1}$ for 10 min, to compete an MEA.

The basis weights of the catalyst metal component, the carbon material, and the electrolyte material in each of the produced MEA were calculated based on the mass of a catalyst layer fixed to the Nafion membrane (electrolyte membrane) found from the mass difference between the mass of the Teflon® sheet before pressing and the mass of the peeled Teflon® sheet after pressing, and the mass ratio of the components in the catalyst layer.

(4) Evaluation of Power Generation Performance of Fuel Cell

An MEA prepared using each carbon material for use as a catalyst carrier of each Experimental Example was fitted into a cell, which was then set on a fuel cell measuring apparatus, and the performance of the fuel cell was evaluated by the following procedure.

On the cathode side air was supplied as an oxidative gas, and on the anode side pure hydrogen was supplied as a reactive gas at a back pressure of 0.05 MPa by regulating the pressure with a back pressure regulating valve placed downstream of the cell so that the respective utilization rates became 40% and 70%. Meanwhile, the cell temperature was set at 80° C., and the supplied oxidative gas, and reactive gas on both the cathode and anode sides were bubbled through distilled water kept at 60° C. in a humidifier, and the power generation in a low humidification state was evaluated.

Under such conditions, a reactive gas was supplied to the cell, and the load was gradually increased, and an inter-terminal voltage of the cell at a current density of 1000 mA/cm$^2$ was recorded as the output voltage, and the performance evaluation of the fuel cell was performed. Then, the rating was made according to the following criteria for acceptable ranks A and B, and rejected rank C. The results are shown in Table 1.

[Acceptable Rank]
A: The output voltage at 1000 mA/cm$^2$ is 0.65 V or more.
B: The output voltage at 1000 mA/cm$^2$ is 0.60 V or more.

[Reject Rank]
C: Inferior to the acceptable rank B.

[Evaluation of Durability]

In the cell, the anode was kept as it was, while flowing an argon gas in the same humidification state as above to the cathode, 250 cycles of the following repetitive operation of rectangular pulse-like voltage profile were performed, wherein in one cycle an operation of holding the cell voltage at 1.0 V for 4 sec, and then an operation of holding the cell voltage at 1.3 V for 4 sec were performed in series (repetitive operation of rectangular pulse-like voltage profile). Thereafter the durability was examined in the same manner as the above evaluation of the high current characteristics, and the rating was made according to the following criteria for acceptable ranks A and B, and rejected rank C. The results are shown in Table 1.

[Acceptable Tank]
A: The output voltage at 1000 mA/cm$^2$ is 0.65 V or more.
B: The output voltage at 1000 mA/cm$^2$ is 0.60 V or more.

[Reject Rank]
C: Inferior to the acceptable rank B.

TABLE 1

| | Acetylide producing step | | | Carbon material for use as catalyst carrier | | | | | | Battery performance | | |
|---|---|---|---|---|---|---|---|---|---|---|---|---|
| | Acetylene blowing time (min) | Acetylene/ silver nitrate (mol/mol) | Heat treatment step (° C.) | BET (m$^2$/g) | V$_{2-10}$ (mL/g) | V$_{macro}$ (cc/g) | ΔG (cm$^{-1}$) | Content of crystallized material | Yield at classification (%) | Power generation performance | Durability | Remarks |
| Experimental Example 1 | 15 | 0.247 | 2050 | 820 | 0.42 | 420 | 54 | 2.2 | 83 | B | B | C |
| Experimental Example 2 | 20 | 0.337 | 2050 | 840 | 0.47 | 430 | 57 | 1.8 | 85 | B | B | C |
| Experimental Example 3 | 22 | 0.371 | 2050 | 890 | 0.58 | 480 | 59 | 1.5 | 92 | B | B | E |
| Experimental Example 4 | 23 | 0.388 | 2050 | 900 | 0.61 | 540 | 59 | 1.4 | 93 | B | B | E |
| Experimental Example 5 | 25 | 0.412 | 2050 | 960 | 0.65 | 540 | 60 | 1.2 | 95 | B | B | E |
| Experimental Example 6 | 27 | 0.445 | 2050 | 960 | 0.65 | 550 | 60 | 1.2 | 95 | B | B | E |
| Experimental Example 7 | 28 | 0.462 | 2050 | 940 | 0.65 | 560 | 60 | 1.3 | 96 | B | B | E |
| Experimental Example 8 | 30 | 0.495 | 2050 | 900 | 0.59 | 520 | 59 | 1.3 | 97 | B | B | E |
| Experimental Example 9 | 25 | 0.412 | 2025 | 1040 | 0.65 | 550 | 60 | 1.3 | 96 | A | A | E |
| Experimental Example 10 | 28 | 0.462 | 2025 | 1060 | 0.63 | 560 | 60 | 1.3 | 96 | A | A | E |
| Experimental Example 11 | 30 | 0.495 | 2025 | 1050 | 0.58 | 580 | 59 | 1.4 | 97 | A | A | E |
| Experimental Example 12 | 15 | 0.247 | 2000 | 940 | 0.43 | 520 | 60 | 1.9 | 85 | A | A | C |
| Experimental Example 13 | 20 | 0.337 | 2000 | 960 | 0.47 | 480 | 60 | 1.8 | 86 | A | A | C |
| Experimental Example 14 | 23 | 0.388 | 2000 | 1090 | 0.59 | 540 | 60 | 1.5 | 93 | A | A | E |
| Experimental Example 15 | 25 | 0.412 | 2000 | 1150 | 0.65 | 590 | 60 | 1.2 | 96 | A | A | E |
| Experimental Example 16 | 28 | 0.462 | 2000 | 1170 | 0.63 | 580 | 62 | 1.3 | 96 | A | A | E |
| Experimental Example 17 | 30 | 0.495 | 2000 | 1150 | 0.59 | 600 | 61 | 1.3 | 96 | A | A | E |
| Experimental Example 18 | 25 | 0.412 | 1900 | 1280 | 0.67 | 610 | 64 | 1.3 | 95 | A | B | E |
| Experimental Example 19 | 28 | 0.462 | 1900 | 1320 | 0.65 | 580 | 63 | 1.3 | 96 | A | B | E |
| Experimental Example 20 | 30 | 0.495 | 1900 | 1300 | 0.63 | 590 | 62 | 1.4 | 96 | A | B | E |
| Experimental Example 21 | 28 | 0.462 | 1800 | 1320 | 0.67 | 680 | 63 | 1.2 | 96 | A | B | E |
| Experimental Example 22 | 30 | 0.495 | 1800 | 1300 | 0.64 | 650 | 66 | 1.2 | 97 | A | B | E |
| Experimental Example 23 | 28 | 0.462 | 1700 | 1380 | 0.67 | 820 | 67 | 1.2 | 96 | A | B | E |
| Experimental Example 24 | 30 | 0.495 | 1700 | 1390 | 0.63 | 790 | 65 | 1.3 | 97 | A | B | E |
| Experimental Example 25 | 30 | 0.495 | 1500 | 1480 | 0.61 | 830 | 68 | 1.6 | 97 | A | B | E |

TABLE 2

| | Acetylide producing step | | | Carbon material for use as catalyst carrier | | | | | | Battery performance | | |
|---|---|---|---|---|---|---|---|---|---|---|---|---|
| | Acetylene blowing time (min) | Acetylene/ silver nitrate (mol/mol) | Heat treatment step (° C.) | BET ($m^2/g$) | $V_{2-10}$ (mL/g) | $V_{macro}$ (cc/g) | $\Delta G$ ($cm^{-1}$) | Content of crystallized material | Yield at classification (%) | Power generation performance | Durability | Remarks |
| Experimental Example 26 | 32 | 0.528 | 2050 | 1030 | 0.42 | 420 | 57 | 1.7 | 86 | B | B | C |
| Experimental Example 27 | 35 | 0.577 | 2050 | 1050 | 0.42 | 440 | 56 | 2.2 | 83 | B | B | C |
| Experimental Example 28 | 32 | 0.528 | 2025 | 1100 | 0.44 | 510 | 59 | 1.7 | 85 | A | A | C |
| Experimental Example 29 | 35 | 0.577 | 2025 | 1120 | 0.45 | 520 | 58 | 2.5 | 82 | A | A | C |
| Experimental Example 30 | 25 | 0.412 | 2200 | 820 | 0.59 | 540 | 54 | 3.4 | 85 | B | B | C |
| Experimental Example 31 | 28 | 0.462 | 2200 | 830 | 0.59 | 550 | 55 | 3.5 | 83 | B | B | C |
| Experimental Example 32 | 30 | 0.495 | 2200 | 850 | 0.55 | 530 | 55 | 3.5 | 81 | B | B | C |
| Experimental Example 33 | 32 | 0.528 | 2200 | 880 | 0.42 | 380 | 52 | 4.8 | 76 | B | B | C |
| Experimental Example 34 | 35 | 0.577 | 2200 | 890 | 0.44 | 390 | 51 | 5.2 | 72 | B | B | C |
| Experimental Example 35 | 32 | 0.528 | 2000 | 1250 | 0.45 | 480 | 59 | 1.7 | 83 | A | A | C |
| Experimental Example 36 | 35 | 0.577 | 2000 | 1230 | 0.43 | 470 | 58 | 2.2 | 81 | A | A | C |
| Experimental Example 37 | 32 | 0.528 | 1900 | 1350 | 0.44 | 470 | 64 | 1.8 | 84 | A | B | C |
| Experimental Example 38 | 35 | 0.577 | 1900 | 1380 | 0.41 | 450 | 66 | 2.3 | 83 | A | B | C |
| Experimental Example 39 | 32 | 0.528 | 1800 | 1350 | 0.43 | 530 | 66 | 1.8 | 82 | A | B | C |
| Experimental Example 40 | 35 | 0.577 | 1800 | 1350 | 0.41 | 550 | 67 | 2.4 | 85 | A | B | C |
| Experimental Example 41 | 32 | 0.528 | 1700 | 1550 | 0.45 | 650 | 66 | 1.8 | 82 | A | B | C |
| Experimental Example 42 | 32 | 0.528 | 1500 | 1600 | 0.48 | 880 | 67 | 2.6 | 86 | A | B | C |
| Experimental Example 43 | 35 | 0.577 | 1500 | 1650 | 0.44 | 620 | 66 | 2.3 | 83 | A | B | C |
| Experimental Example 44 | 25 | 0.412 | 2300 | 350 | 0.59 | 510 | 47 | 7.7 | 85 | C | C | C |
| Experimental Example 45 | 30 | 0.495 | 2300 | 360 | 0.55 | 370 | 46 | 8.2 | 83 | C | C | C |
| Experimental Example 46 | 35 | 0.577 | 2300 | 380 | 0.42 | 350 | 43 | 9.7 | 68 | C | C | C |
| Experimental Example 47 | 30 | 0.495 | 1300 | 1680 | 0.61 | 820 | 74 | 1.2 | 84 | A | C | C |
| Experimental Example 48 | 30 | 0.495 | 1100 | 1750 | 0.63 | 850 | 76 | 1.3 | 86 | A | C | C |

TABLE 3

| | Heat treatment step (° C.) | Carbon material for use as catalyst carrier | | | | Battery performance | | |
|---|---|---|---|---|---|---|---|---|
| | | BET ($m^2/g$) | $V_{2-10}$ (mL/g) | $V_{macro}$ (cc/g) | $\Delta G$ ($cm^{-1}$) | Power generation performance | Durability | Remarks |
| Experimental Example 49 | 1400 | 1200 | 1.0 | 1430 | 66 | C | C | C |
| Experimental Example 50 | 1700 | 580 | 0.58 | 1350 | 40 | C | C | C |
| Experimental Example 51 | 2000 | 360 | 0.26 | 1290 | 39 | C | C | C |

The branch diameters of the carbon materials for use as a catalyst carrier of the Experimental Examples for which "E" is entered in the remarks column were observed according to the method described above, and it was confirmed that the branch diameters were 500 nm or less in all cases.

The entire contents of the disclosures by Japanese Patent Application No. 2017-071626 are incorporated herein by reference.

All the literature, patent application, and technical standards cited herein are also herein incorporated to the same extent as provided for specifically and severally with respect to an individual literature, patent application, and technical standard to the effect that the same should be so incorporated by reference.

The invention claimed is:

1. A carbon material for use as a catalyst carrier for a polymer electrolyte fuel cell, having a three-dimensional dendritic structure in which a rod-shaped body or a ring-shaped body is branched three-dimensionally, the carbon material being a porous carbon material made from a silver acetylide and satisfying the following (1), (2), (3), and (4) at the same time:

(1) a content of a crystallized material defined below is 1.2 or more and 1.6 or less,
    wherein the content of the crystallized material is determined by [(C/A)−(B/A)], when the carbon material for use as a catalyst carrier is heated at 2050° C. in an inert atmosphere for 1 hour and powder X-ray diffractometry is performed, and a height of a baseline of a diffraction peak of a (002) plane at the location of a second peak appearing near a diffraction angle of 25.5° to 26.5° is defined as the A value, a height of a baseline of the second peak near the diffraction angle of 25.5° to 26.5° at the location of the second peak appearing near the diffraction angle of 25.5° to 26.5° is defined as the B value, and an intensity of the second peak near the diffraction angle of 25.5° to 26.5° is defined as the C value;

(2) a BET specific surface area obtained by a BET analysis of a nitrogen gas adsorption isotherm is from 400 to 1500 $m^2/g$;

(3) a cumulative pore volume $V_{2-10}$ with respect to a pore diameter of from 2 to 10 nm obtained by an analysis of a nitrogen gas adsorption isotherm using the Dollimore-Heal method is from 0.4 to 1.5 mL/g; and (4) a nitrogen gas adsorption amount $V_{macro}$ between a relative pressure of 0.95 and 0.99 in a nitrogen gas adsorption isotherm is from 300 to 1200 cc/g in standard temperature and pressure (STP).

2. The carbon material for use as a catalyst carrier for a polymer electrolyte fuel cell according to claim 1, wherein a half-value width ΔG of a G-band detected in a range of from 1550 to 1650 cm$^{-1}$ of a Raman spectrum is from 50 to 70 cm$^{-1}$.

3. The carbon material for use as a catalyst carrier for a polymer electrolyte fuel cell according to claim 2, wherein the $V_{2\text{-}10}$ is from 0.5 to 1.0 mL/g.

4. The carbon material for use as a catalyst carrier for a polymer electrolyte fuel cell according to claim 1, wherein the $V_{2\text{-}10}$ is from 0.5 to 1.0 mL/g.

* * * * *